United States Patent
Igasaki

(10) Patent No.: US 11,131,871 B2
(45) Date of Patent: Sep. 28, 2021

(54) LASER PROCESSING DEVICE AND OPERATION CHECKING METHOD

(71) Applicant: HAMAMATSU PHOTONICS K.K., Hamamatsu (JP)

(72) Inventor: Yasunori Igasaki, Hamamatsu (JP)

(73) Assignee: HAMAMATSU PHOTONICS K.K., Hamamatsu (JP)

(*) Notice: Subject to any disclaimer, the term of this patent is extended or adjusted under 35 U.S.C. 154(b) by 348 days.

(21) Appl. No.: 16/341,605

(22) PCT Filed: Oct. 11, 2017

(86) PCT No.: PCT/JP2017/036872
§ 371 (c)(1),
(2) Date: Apr. 12, 2019

(87) PCT Pub. No.: WO2018/070445
PCT Pub. Date: Apr. 19, 2018

(65) Prior Publication Data
US 2020/0047283 A1 Feb. 13, 2020

(30) Foreign Application Priority Data

Oct. 14, 2016 (JP) ................. 2016-202601

(51) Int. Cl.
*G02F 1/135* (2006.01)
*G02F 1/13* (2006.01)
(Continued)

(52) U.S. Cl.
CPC ........... *G02F 1/1309* (2013.01); *G01M 11/02* (2013.01); *G01N 21/93* (2013.01);
(Continued)

(58) Field of Classification Search
CPC ............... G02F 1/1309; G02F 2203/12; G02F 2203/69; G01N 21/93; G01M 11/02; B23K 26/707; H01S 3/0014; H01S 3/1065
See application file for complete search history.

(56) References Cited

U.S. PATENT DOCUMENTS

| | | | |
|---|---|---|---|
| 8,165,838 B2* | 4/2012 | Kane | H01S 3/0014 702/85 |
| 2010/0108889 A1* | 5/2010 | Shen | G01N 21/3577 250/341.1 |

(Continued)

FOREIGN PATENT DOCUMENTS

| | | |
|---|---|---|
| CN | 1943083 A | 4/2007 |
| CN | 101618637 A | 1/2010 |

(Continued)

OTHER PUBLICATIONS

International Preliminary Report on Patentability dated Apr. 25, 2019 for PCT/JP2017/036872.

*Primary Examiner* — Paisley L Wilson
(74) *Attorney, Agent, or Firm* — Faegre Drinker Biddle & Reath LLP

(57) ABSTRACT

There is provided a laser processing device that includes a laser light source configured to output laser light, a spatial light modulator configured to modulate the laser light output from the laser light source according to a phase pattern and emit the modulated laser light, an objective lens configured to converge the laser light emitted from the spatial light modulator onto an object, a controller configured to control a phase pattern to be displayed on the spatial light modulator, and a determiner configured to determine whether operation of the spatial light modulator is normal, in which the controller performs switching control in which the phase pattern to be displayed on the spatial light modulator is (Continued)

switched, and the determiner makes the determination on the basis of a change in intensity of the laser light emitted from the spatial light modulator between before the switching control and after the switching control.

6 Claims, 22 Drawing Sheets

(51) Int. Cl.

| | | |
|---|---|---|
| *G01M 11/02* | (2006.01) | |
| *G01N 21/93* | (2006.01) | |
| *H01S 3/00* | (2006.01) | |
| *B23K 26/70* | (2014.01) | |
| *H01S 3/106* | (2006.01) | |
| *B23K 26/06* | (2014.01) | |

(52) U.S. Cl.
CPC ........ *B23K 26/0648* (2013.01); *B23K 26/707* (2015.10); *G02F 2203/12* (2013.01); *G02F 2203/69* (2013.01); *H01S 3/0014* (2013.01); *H01S 3/1065* (2013.01)

(56) References Cited

U.S. PATENT DOCUMENTS

| | | |
|---|---|---|
| 2014/0307299 A1 | 10/2014 | Matsumoto et al. |
| 2016/0096236 A1 | 4/2016 | Cho et al. |
| 2016/0131901 A1* | 5/2016 | Huang ............... G02B 27/0068 250/201.9 |

FOREIGN PATENT DOCUMENTS

| | | |
|---|---|---|
| CN | 101861228 A | 10/2010 |
| CN | 104620163 A | 5/2015 |
| CN | 105940345 A | 9/2016 |
| GB | 2501117 A | 10/2013 |
| JP | 3878758 B2 | 2/2007 |
| JP | 2011-51011 A | 3/2011 |
| JP | 2011-212750 A | 10/2011 |
| JP | 2014-138956 A | 7/2014 |
| WO | WO-2013/153371 A1 | 10/2013 |
| WO | WO-2015/159687 A1 | 10/2015 |

* cited by examiner

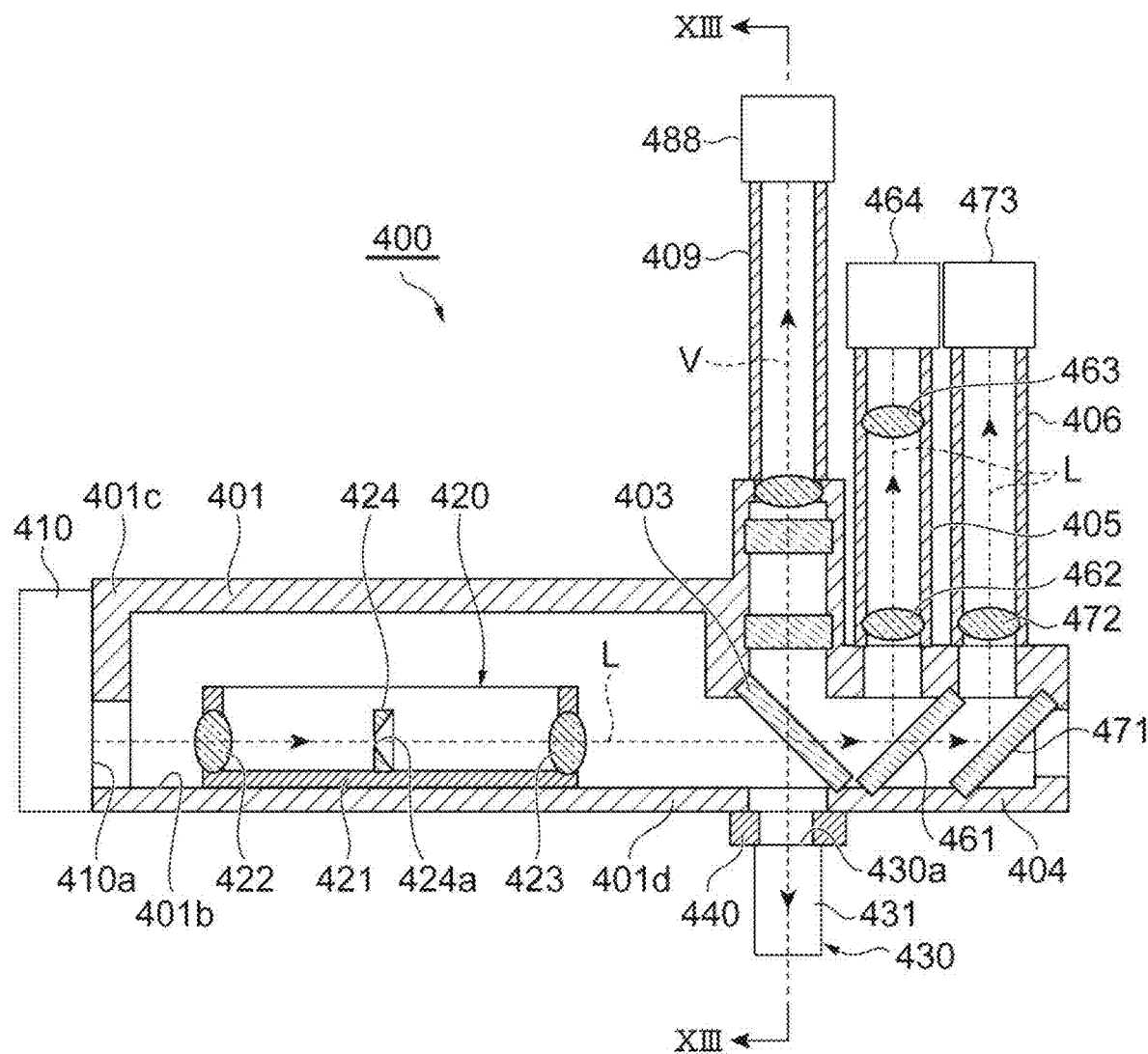
Fig.12
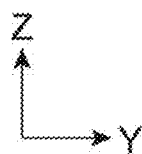

(a)

(b)

(a)

(b)

(a)

(b)

LASER PROCESSING DEVICE AND OPERATION CHECKING METHOD

TECHNICAL FIELD

One aspect of the present invention relates to a laser processing device and an operation checking method.

BACKGROUND ART

Patent Literature 1 discloses a laser processing device that performs laser processing of an object to be processed by irradiating the object to be processed with laser light. In such laser light processing, output laser light from a laser light source is modulated by a spatial light modulator, and then converged on the object to be processed by an objective lens.

CITATION LIST

Patent Literature

Patent Literature 1: Japanese Unexamined Patent Publication No. 2011-51011

SUMMARY OF INVENTION

Technical Problem

In the laser processing device as described above, in a case where operation of the spatial light modulator is not normal, the object to be processed may not be appropriately irradiated with laser light. Accordingly, it is necessary to check the operation of the spatial light modulator at any timing. Meanwhile, the present inventors have found that the timing other than the time of laser processing is preferable as the operation checking timing of the spatial light modulator.

It is an object of one aspect of the present invention to provide a laser processing device and an operation checking method capable of checking operation of a spatial light modulator at timing other than the time of processing.

Solution to Problem

A laser processing device according to one aspect of the present invention having at least a first mode in which an object is irradiated with laser light to perform laser processing and a second mode different from the first mode, the laser processing device including: a laser light source configured to output the laser light; a spatial light modulator configured to modulate the laser light output from the laser light source according to a phase pattern and emit the laser light; a converging lens configured to converge the laser light emitted from the spatial light modulator onto the object; a controller configured to control a phase pattern to be displayed on the spatial light modulator; and a determiner configured to determine whether operation of the spatial light modulator is normal when the second mode is being executed, in which the controller performs switching control in which the phase pattern to be displayed on the spatial light modulator is switched when the second mode is being executed, and the determiner makes the determination on the basis of a change in intensity of the laser light emitted from the spatial light modulator between before the switching control and after the switching control.

An operation checking method according to one aspect of the present invention of a spatial light modulator of a laser processing device including a laser light source configured to output laser light, a spatial light modulator configured to modulate the laser light emitted from the laser light source according to a phase pattern and emit the laser light, and a converging lens configured to converge the laser light emitted from the spatial light modulator onto an object, the method including: a first step in which switching control for switching the phase pattern to be displayed on the spatial light modulator is performed when a second mode different from a first mode in which laser processing is performed by irradiating the object with the laser light is being executed in the laser processing device; and a second step in which determination on whether operation of the spatial light modulator is normal is made on the basis of a change in intensity of the laser light between before and after the switching control of the laser light emitted from the spatial light modulator when the second mode is being executed.

In the laser processing device and the operation checking method, the switching control of the phase pattern displayed on the spatial light modulator is performed when the second mode different from the first mode in which the laser processing is performed is being executed. When the operation of the spatial light modulator is normal, the laser light is modulated by different phase patterns before and after the switching control, thereby generating the intensity change of the laser light. On the other hand, when the operation of the spatial light modulator is not normal, the phase pattern may not be switched appropriately before and after the switching control, whereby the intensity change of the laser light may not be generated. Therefore, when the second mode is being executed, it is determined whether the operation of the spatial light modulator is normal on the basis of the intensity change of the laser light L before and after the switching control, whereby it becomes possible to check the operation of the spatial light modulator at timing other than the time of processing.

In the laser processing device according to one aspect of the present invention, the controller may perform the switching control in which the phase pattern to be displayed on the spatial light modulator is switched from a first pattern to a second pattern including a diffraction lattice pattern when the second mode is being executed, and the determiner may calculate an intensity difference by subtracting intensity of the laser light after the switching control from intensity of the laser light before the switching control, and may make the determination on the basis of determination on whether the intensity difference is larger than a threshold value.

In this case, when the operation of the spatial light modulator is normal, the laser light entering the spatial light modulator after the switching control is diffracted by the diffraction lattice pattern included in the second pattern. Therefore, paying attention to the intensity of a part of the diffracted light, it becomes smaller than the intensity of the laser light before the switching control by a certain amount or more. Accordingly, by comparing the intensity difference before and after the switching control with a predetermined threshold value, it is possible to easily and reliably determine whether the operation of the spatial light modulator is normal.

The laser processing device according to one aspect of the present invention may include a focusing lens, which is arranged between the spatial light modulator and the objective lens in the optical path of the laser light to converge the laser light, and the slit member, which is arranged at the focal position on the rear side of the focusing lens in the optical path of the laser light to block the diffracted light of the laser light higher than a certain order diffracted in accordance with the diffraction lattice pattern. In this case, when the operation of the spatial light modulator is normal, the diffracted light higher than the certain order is blocked at the focal position, whereby the intensity difference before and after the switching control can be sufficiently generated. Therefore, it becomes possible to more easily and reliably determine whether the operation of the spatial light modulator is normal.

In the laser processing device according to one aspect of the present invention, the second mode may be a measurement mode in which intensity of the laser light emitted from the objective lens is measured, and the determiner may make the determination on the basis of the intensity of the laser light obtained by a power meter arranged at a rear stage of the objective lens in the optical path of the laser light. In this case, it is possible to check the operation of the spatial light modulator using the measurement mode as a calibration.

The laser processing device according to one aspect of the present invention may include a camera including an imaging surface conjugate with an entrance pupil plane of the objective lens, and configured to obtain an image of the laser light, and the determiner may make the determination on the basis of the intensity of the laser light obtained on the basis of the image obtained by the camera. In this case, it is possible to check the operation of the spatial light modulator using the camera of the laser processing device.

Advantageous Effects of Invention

According to one aspect of the present invention, it is possible to provide a laser processing device and an operation checking method capable of checking operation of a spatial light modulator at timing other than the time of processing.

BRIEF DESCRIPTION OF DRAWINGS

FIG. 12 is a sectional view of the laser converging unit taken along the line XII-XII of FIG. 11.

DESCRIPTION OF EMBODIMENTS

Figure 1:
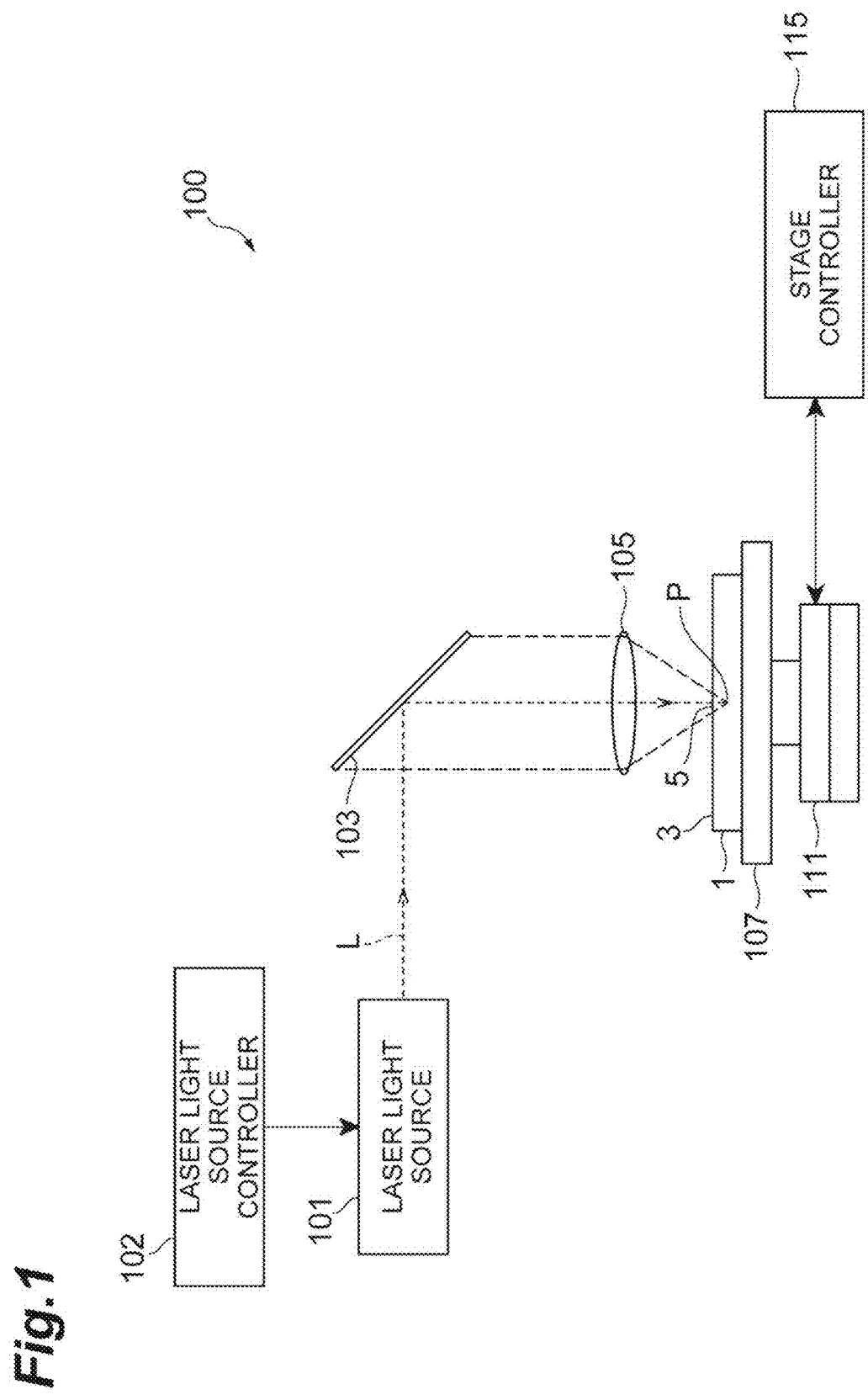
FIG. 1 is a schematic configuration diagram of a laser processing device used for forming a modified region.

Hereinafter, one embodiment of one aspect of the present invention will be described in detail with reference to the drawings. In the drawings, the same elements or corresponding elements are denoted by the same reference numerals, and overlapping explanations may be omitted.

In a laser processing device according to the embodiment, laser light is converged at an object to be processed to form a modified region within the object to be processed along a line to cut. First, formation of the modified region will be described with reference to FIGS. 1 to 6.

As illustrated in FIG. 1, a laser processing device 100 includes a laser light source 101 configured to cause laser light L to oscillate in a pulsating manner, a dichroic mirror 103 arranged so as to change a direction of the optical axis (optical path) of the laser light L by 90°, and a converging lens 105 configured to converge the laser light L. The laser processing device 100 further includes a support table 107 configured to support an object to be processed 1 that is an object to which the laser light L converged by the converging lens 105 is emitted, a stage 111 that is a moving mechanism configured to move the support table 107, a laser light source controller 102 configured to control the laser light source 101 in order to adjust the output, pulse width, pulse waveform, and the like of the laser light L, and a stage controller 115 configured to control the movement of the stage 111.

In the laser processing device 100, the laser light L emitted from the laser light source 101 changes the direction of its optical axis by 90° with the dichroic mirror 103 and then is converged by the converging lens 105 within the object to be processed 1 placed on the support table 107. At the same time, the stage 111 is moved, so that the object to be processed 1 relatively moves with respect to the laser light L along a line to cut 5. Thus, a modified region along the line to cut 5 is formed in the object to be processed 1. While the stage 111 is moved here for relatively moving the laser light L, the converging lens 105 may be moved instead or together therewith.

Figure 2:
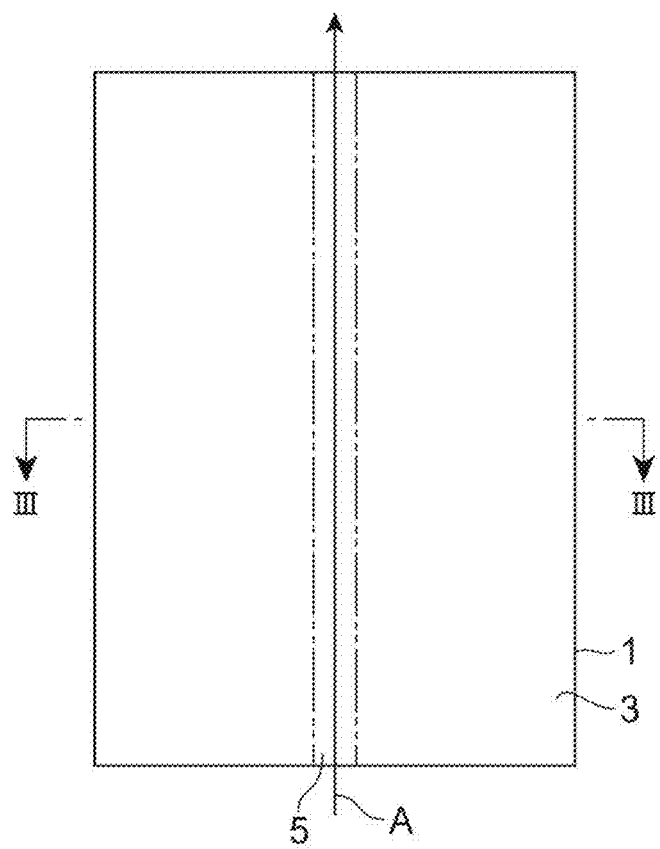
FIG. 2 is a plan view of an object to be processed for which the modified region is formed.
Figure 3:
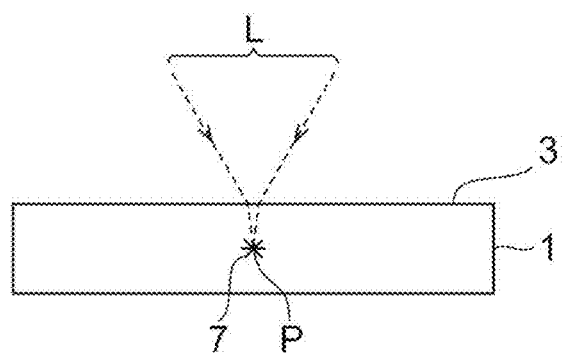
FIG. 3 is a sectional view of the object to be processed taken along the line III-III of FIG. 2.
Figure 4:
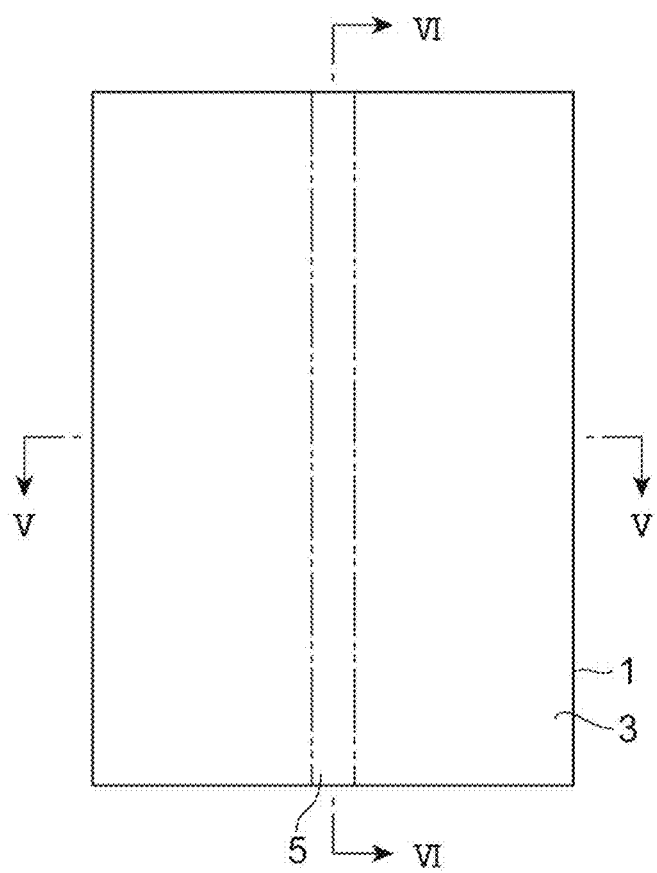
FIG. 4 is a plan view of the object to be processed after laser processing.
Figure 5:
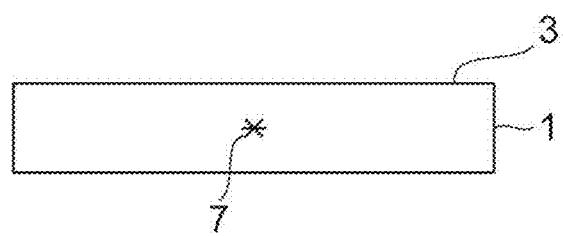
FIG. 5 is a sectional view of the object to be processed taken along the line V-V of FIG. 4.
Figure 6:
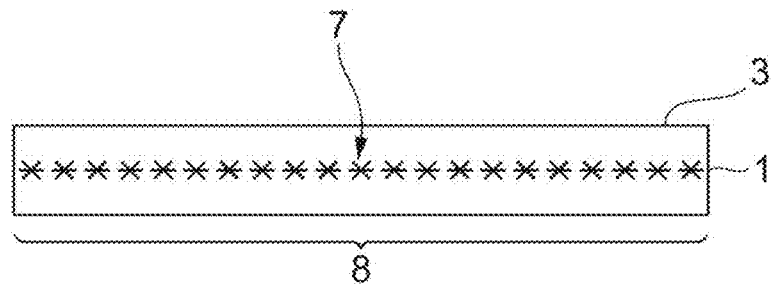
FIG. 6 is a sectional view of the object to be processed taken along the line VI-VI of FIG. 4.

Employed as the object to be processed 1 is a planar member (for example, a substrate or a wafer), examples of which include semiconductor substrates formed of semiconductor materials and piezoelectric substrates formed of piezoelectric materials. As illustrated in FIG. 2, in the object to be processed 1, the line to cut 5 is set for cutting the object to be processed 1. The line to cut 5 is a virtual line extending straight. In a case where a modified region is formed within the object to be processed 1, the laser light L is relatively moved along the line to cut 5 (that is, in the direction of arrow A in FIG. 2) while a converging point (converging position) P is set within the object to be processed 1 as illustrated in FIG. 3. Thus, a modified region 7 is formed within the object to be processed 1 along the line to cut 5 as illustrated in FIGS. 4, 5, and 6, and the modified region 7 formed along the line to cut 5 becomes a cutting start region 8. The line to cut 5 corresponds to an irradiation schedule line.

The converging point P is a position at which the laser light L is converged. The line to cut 5 may be curved instead of being straight, a three-dimensional one combining them, or one specified by coordinates. The line to cut 5 may be one actually drawn on a front surface 3 of the object to be processed 1 without being restricted to the virtual line. The modified region 7 may be formed either continuously or intermittently. The modified region 7 may be formed in either rows or dots, and only needs to be formed at least within the object to be processed 1, on the front surface 3, or on a back surface. A crack may be formed from the modified region 7 as a start point, and the crack and the modified region 7 may be exposed at an outer surface (the front surface 3, the back surface, or an outer peripheral surface) of the object to be processed 1. A laser light entrance surface in forming the modified region 7 is not limited to the front surface 3 of the object to be processed 1 but may be the back surface of the object to be processed 1.

Incidentally, in a case where the modified region 7 is formed within the object to be processed 1, the laser light L is transmitted through the object to be processed 1 and is particularly absorbed near the converging point P located within the object to be processed 1. Thus, the modified region 7 is formed in the object to be processed 1 (that is, internal absorption type laser processing). In this case, the front surface 3 of the object to be processed 1 hardly absorbs the laser light L and thus does not melt. On the other hand, in a case where the modified region 7 is formed on the front surface 3 or the back surface of the object to be processed 1, the laser light L is particularly absorbed near the converging point P located on the front surface 3 or the back surface, and removal portions such as holes and grooves are formed (surface absorption type laser processing) by being melted from the front surface 3 or the back surface and removed.

The modified region 7 is a region in which density, refractive index, mechanical strength, and other physical characteristics are different from the surroundings. Examples of the modified region 7 include a molten processed region (meaning at least one of a region resolidified after having been once molten, a region in the molten state, and a region in the process of resolidifying from the molten state), a crack region, a dielectric breakdown region, a refractive index changed region, and a mixed region thereof. Other examples of the modified region 7 include a region where the density of the modified region 7 has changed compared to the density of an unmodified region in a material of the object to be processed 1, and a region formed with a lattice defect. In a case where the material of the object to be processed 1 is single crystal silicon, the modified region 7 can also be said to be a high dislocation density region.

The molten processed region, refractive index changed region, region where the density of the modified region 7 has changed compared to the density of the unmodified region, and region formed with the lattice defect may further incorporate the crack (cracking or microcrack) therewithin or at an interface between the modified region 7 and the unmodified region. The incorporated crack may be formed over the whole surface of the modified region 7 or in only a portion or a plurality of portions thereof. The object to be processed 1 includes a substrate made of a crystalline material having a crystal structure. For example, the object to be processed 1 includes a substrate formed of at least one of gallium nitride (GaN), silicon (Si), silicon carbide (SiC), LiTaO3, and sapphire (Al2O3). In other words, the object to be processed 1 includes, for example, a gallium nitride substrate, a silicon substrate, a SiC substrate, a LiTaO3 substrate, or a sapphire substrate. The crystalline material may be either an anisotropic crystal or an isotropic crystal. In addition, the object to be processed 1 may include a substrate made of a non-crystalline material having a non-crystalline structure (amorphous structure), and may include a glass substrate, for example.

In the embodiment, the modified region 7 can be formed by forming a plurality of modified spots (processing marks) along the line to cut 5. In this case, the plurality of modified spots gathers to be the modified region 7. Each of the modified spots is a modified portion formed by a shot of one pulse of pulsed laser light (that is, laser irradiation of one pulse: laser shot). Examples of the modified spots include crack spots, molten processed spots, refractive index changed spots, and those in which at least one of them is mixed. As for the modified spots, their sizes and lengths of the crack occurring therefrom can be controlled as necessary in view of the required cutting accuracy, the required flatness of cut surfaces, the thickness, kind, and crystal orientation of the object to be processed 1, and the like. In addition, in the embodiments, the modified spots can be formed as the modified region 7, along the line to cut 5.

[Laser Processing Device According to Embodiments]

Next, the laser processing device according to the embodiments will be described. In the following descriptions, the directions orthogonal to each other in the horizontal plane are defined as the X-axis direction and the Y-axis direction, and the vertical direction is defined as the Z-axis direction.

[Overall Configuration of Laser Processing Device]

Figure 7:
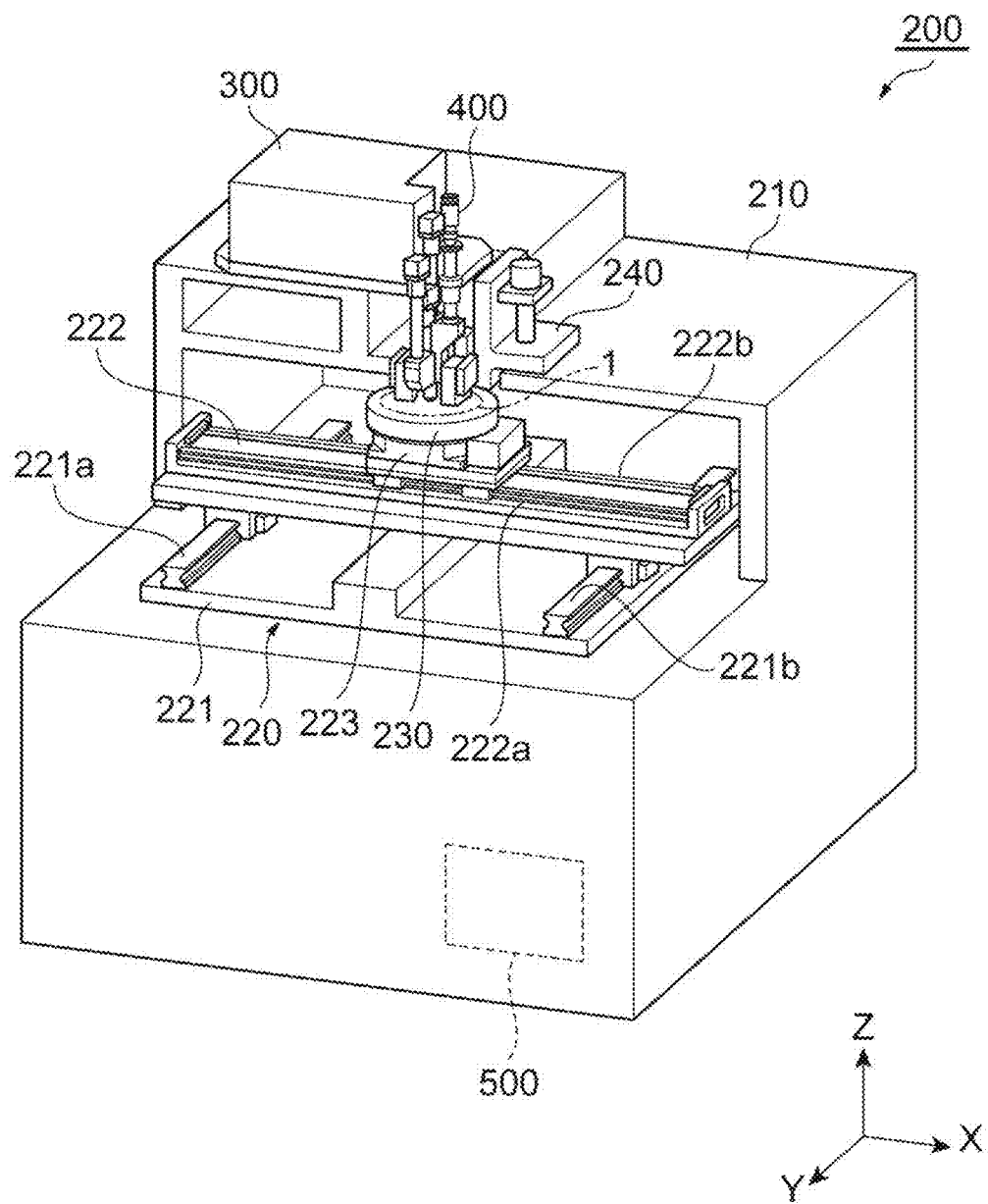
FIG. 7 is a perspective view of a laser processing device according to an embodiment.

As illustrated in FIG. 7, a laser processing device 200 includes a device frame 210, a first moving mechanism (moving mechanism) 220, a support table 230, and a second moving mechanism 240. Further, the laser processing device 200 includes a laser output unit 300, a laser converging unit 400, and a controller 500.

The first moving mechanism 220 is attached to the device frame 210. The first moving mechanism 220 includes a first rail unit 221, a second rail unit 222, and a movable base 223. The first rail unit 221 is attached to the device frame 210. The first rail unit 221 is provided with a pair of rails 221a and 221b extending along the Y-axis direction. The second rail unit 222 is attached to the pair of rails 221a and 221b of the first rail unit 221 so as to be movable along the Y-axis direction. The second rail unit 222 is provided with a pair of rails 222a and 222b extending along the X-axis direction. The movable base 223 is attached to the pair of rails 222a and 222b of the second rail unit 222 so as to be movable along the X-axis direction. The movable base 223 is rotatable about an axis parallel to the Z-axis direction as the center.

Figure 8:
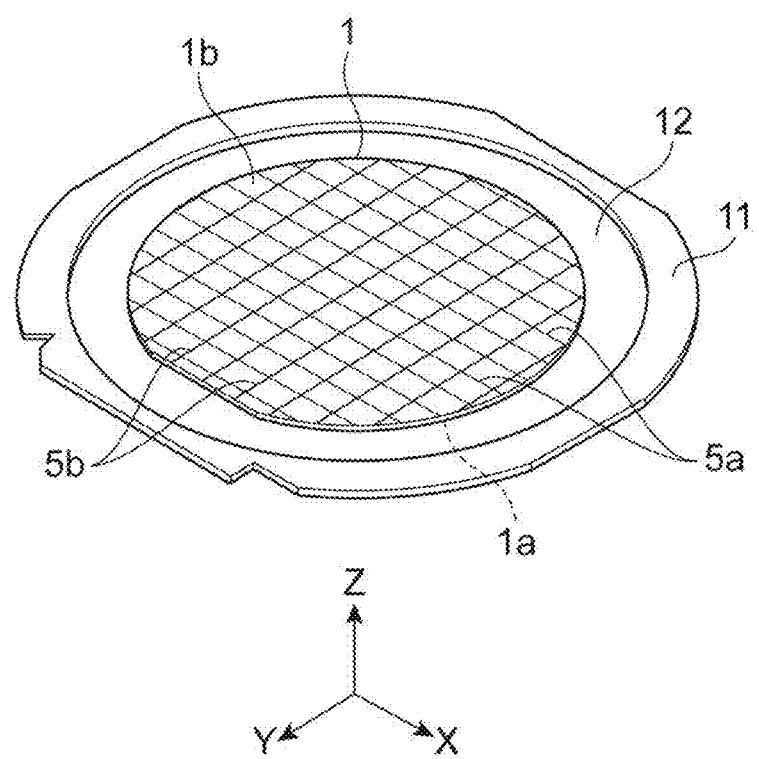
FIG. 8 is a perspective view of an object to be processed attached to a support table of the laser processing device of FIG. 7.

The support table 230 is attached to the movable base 223. The support table 230 supports the object to be processed 1. The object to be processed 1 includes a plurality of functional devices (a light receiving device such as a photodiode, a light emitting device such as a laser diode, a circuit device formed as a circuit, or the like) formed in a matrix shape on the front surface side of a substrate made of a semiconductor material such as silicon. When the object to be processed 1 is supported on the support table 230, as illustrated in FIG. 8, on a film 12 stretched over an annular frame 11, for example, a front surface 1a of the object to be processed 1 (a surface of the plurality of functional devices side) is pasted. The support table 230 holds the frame 11 with a clamp and suctions the film 12 with a vacuum chuck table, to support the object to be processed 1. On the support table 230, a plurality of lines to cut 5a parallel to each other and a plurality of lines to cut 5b parallel to each other are set in a grid pattern so as to pass between adjacent functional devices on the object to be processed 1.

As illustrated in FIG. 7, the support table 230 is moved along the Y-axis direction by operation of the second rail unit 222 in the first moving mechanism 220. In addition, the support table 230 is moved along the X-axis direction by operation of the movable base 223 in the first moving mechanism 220. Further, the support table 230 is rotated about the axis parallel to the Z-axis direction as the center by operation of the movable base 223 in the first moving mechanism 220. As described above, the support table 230 is attached to the device frame 210 to be movable along the X-axis direction and the Y-axis direction, and to be rotatable about the axis parallel to the Z-axis direction as the center.

The laser output unit 300 is attached to the device frame 210. The laser converging unit 400 is attached to the device frame 210 via the second moving mechanism 240. The laser converging unit 400 is moved along the Z-axis direction by operation of the second moving mechanism 240. As described above, the laser converging unit 400 is attached to the device frame 210 so as to be movable along the Z-axis direction with respect to the laser output unit 300.

The controller 500 includes a central processing unit (CPU), read-only memory (ROM), random access memory (RAM), and the like. The controller 500 controls operation of each unit of the laser processing device 200.

As an example, in the laser processing device 200, a modified region is formed within the object to be processed 1 along each of the lines to cut 5a and 5b (see FIG. 8) as follows.

First, the object to be processed 1 is supported on the support table 230 such that a back surface 1b (see FIG. 8) of the object to be processed 1 becomes the laser light entrance surface, and each of the lines to cut 5a of the object to be processed 1 is aligned in a direction parallel to the X-axis direction. Subsequently, the laser converging unit 400 is moved by the second moving mechanism 240 such that the converging point of the laser light L is located at a position apart from the laser light entrance surface of the object to be processed 1 by a predetermined distance within the object to be processed 1. Subsequently, while a constant distance is maintained between the laser light entrance surface of the object to be processed 1 and the converging point of the laser light L, the converging point of the laser light L is relatively moved along each line to cut 5a. Thus, the modified region is formed within the object to be processed 1 along each of the lines to cut 5a.

When the formation of the modified region along each of the lines to cut 5a is completed, the support table 230 is rotated by the first moving mechanism 220, and each of the lines to cut 5b of the object to be processed 1 is aligned in the direction parallel to the X-axis direction. Subsequently, the laser converging unit 400 is moved by the second moving mechanism 240 such that the converging point of the laser light L is located at a position apart from the laser light entrance surface of the object to be processed 1 by a predetermined distance within the object to be processed 1. Subsequently, while a constant distance is maintained between the laser light entrance surface of the object to be processed 1 and the converging point of the laser light L, the converging point of the laser light L is relatively moved along each line to cut 5b. Thus, the modified region is formed within the object to be processed 1 along each line to cut 5b.

As described above, in the laser processing device 200, the direction parallel to the X-axis direction is a processing direction (scanning direction of the laser light L). Note that, the relative movement of the converging point of the laser light L along each line to cut 5a and the relative movement of the converging point of the laser light L along each line to cut 5b are performed by the movement of the support table 230 along the X-axis direction by the first moving mechanism 220. In addition, the relative movement of the converging point of the laser light L between the lines to cut 5a and the relative movement of the converging point of the laser light L between the lines to cut 5b are performed by the movement of the support table 230 along the Y-axis direction by the first moving mechanism 220.

Figure 9:
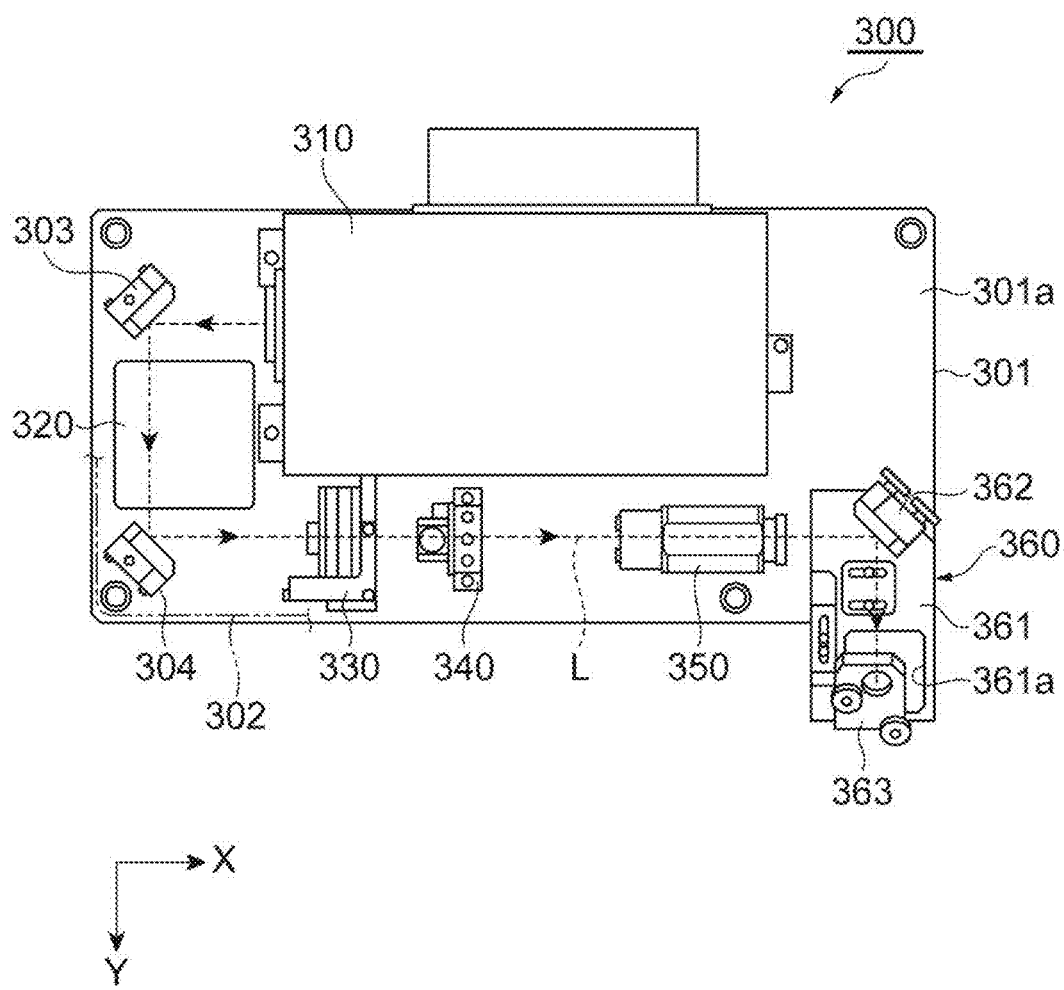
FIG. 9 is a sectional view of a laser output unit taken along the ZX plane of FIG. 7.

As illustrated in FIG. 9, the laser output unit 300 includes a mounting base 301, a cover 302, and a plurality of mirrors 303 and 304. Further, the laser output unit 300 includes a laser oscillator (laser light source) 310, a shutter 320, a $\lambda/2$ wave plate unit 330, a polarizing plate unit 340, a beam expander 350, and a mirror unit 360.

The mounting base 301 supports the plurality of mirrors 303 and 304, the laser oscillator 310, the shutter 320, the $\lambda/2$ wave plate unit 330, the polarizing plate unit 340, the beam expander 350, and the mirror unit 360. The plurality of mirrors 303 and 304, the laser oscillator 310, the shutter 320, the $\lambda/2$ wave plate unit 330, the polarizing plate unit 340, the beam expander 350, and the mirror unit 360 are attached to a main surface 301a of the mounting base 301. The mounting base 301 is a planar member and is detachable with respect to the device frame 210 (see FIG. 7). The laser output unit 300 is attached to the device frame 210 via the mounting base 301. That is, the laser output unit 300 is detachable with respect to the device frame 210.

The cover 302 covers the plurality of mirrors 303 and 304, the laser oscillator 310, the shutter 320, the $\lambda/2$ wave plate unit 330, the polarizing plate unit 340, the beam expander 350, and the mirror unit 360 on the main surface 301a of the mounting base 301. The cover 302 is detachable with respect to the mounting base 301.

The laser oscillator 310 oscillates linearly polarized laser light L in a pulsating manner along the X-axis direction. The wavelength of the laser light L emitted from the laser oscillator 310 is included in any of the wavelength bands of from 500 nm to 550 nm, from 1000 nm to 1150 nm, or from 1300 nm to 1400 nm. The laser light L in the wavelength band of from 500 nm to 550 nm is suitable for internal absorption type laser processing on a substrate made of sapphire, for example. The laser light L in each of the wavelength bands of from 1000 nm to 1150 nm and from 1300 nm to 1400 nm is suitable for internal absorption type laser processing on a substrate made of silicon, for example. The polarization direction of the laser light L emitted from the laser oscillator 310 is, for example, a direction parallel to the Y-axis direction. The laser light L emitted from the laser oscillator 310 is reflected by the mirror 303 and enters the shutter 320 along the Y-axis direction.

In the laser oscillator 310, ON/OFF of the output of the laser light L is switched as follows. In a case where the laser oscillator 310 includes a solid state laser, ON/OFF of a Q switch (acousto-optic modulator (AOM), electro-optic modulator (EOM), or the like) provided in a resonator is switched, whereby ON/OFF of the output of the laser light L is switched at high speed. In a case where the laser oscillator 310 includes a fiber laser, ON/OFF of the output of a semiconductor laser constituting a seed laser and an amplifier (excitation) laser is switched, whereby ON/OFF of the output of the laser light L is switched at high speed. In a case where the laser oscillator 310 uses an external modulation device, ON/OFF of the external modulation device (AOM, EOM, or the like) provided outside the resonator is switched, whereby ON/OFF of the output of the laser light L is switched at high speed.

The shutter 320 opens and closes the optical path of the laser light L by a mechanical mechanism. Switching ON/OFF of the output of the laser light L from the laser output unit 300 is performed by switching ON/OFF of the output of the laser light L in the laser oscillator 310 as described above, and the shutter 320 is provided, whereby the laser light L is prevented from being unexpectedly emitted from the laser output unit 300, for example. The laser light L having passed through the shutter 320 is reflected by the mirror 304 and sequentially enters the $\lambda/2$ wave plate unit 330 and the polarizing plate unit 340 along the X-axis direction.

The $\lambda/2$ wave plate unit 330 and the polarizing plate unit 340 function as the output adjusting unit configured to adjust the output (light intensity) of the laser light L. In addition, the $\lambda/2$ wave plate unit 330 and the polarizing plate unit 340 each function as the polarization direction adjusting unit configured to adjust the polarization direction of the laser light L. The laser light L having sequentially passed through the $\lambda/2$ wave plate unit 330 and the polarizing plate unit 340 enters the beam expander 350 along the X-axis direction.

The beam expander 350 collimates the laser light L while adjusting the diameter of the laser light L. The laser light L having passed through the beam expander 350 enters the mirror unit 360 along the X-axis direction.

The mirror unit 360 includes a support base 361 and a plurality of mirrors 362 and 363. The support base 361 supports the plurality of mirrors 362 and 363. The support base 361 is attached to the mounting base 301 so as to be position adjustable along the X-axis direction and the Y-axis direction. The mirror (first mirror) 362 reflects the laser light L having passed through the beam expander 350 in the Y-axis direction. The mirror 362 is attached to the support base 361 such that its reflective surface is angle adjustable around an axis parallel to the Z-axis, for example.

The mirror (second mirror) 363 reflects the laser light L reflected by the mirror 362 in the Z-axis direction. The mirror 363 is attached to the support base 361 such that its reflective surface is angle adjustable around an axis parallel to the X-axis, for example, and is position adjustable along the Y-axis direction. The laser light L reflected by the mirror 363 passes through an opening 361a formed in the support base 361 and enters the laser converging unit 400 (see FIG. 7) along the Z-axis direction. That is, an emission direction of the laser light L by the laser output unit 300 coincides with a moving direction of the laser converging unit 400. As described above, each of the mirrors 362 and 363 includes a mechanism configured to adjust the angle of the reflective surface.

In the mirror unit 360, the position adjustment of the support base 361 with respect to the mounting base 301, the position adjustment of the mirror 363 with respect to the support base 361, and the angle adjustment of the reflective surface of each of the mirrors 362 and 363 are performed, whereby the position and angle of the optical axis of the laser light L emitted from the laser output unit 300 are aligned with respect to the laser converging unit 400. That is, each of the plurality of mirrors 362 and 363 is a component configured to adjust the optical axis of the laser light L emitted from the laser output unit 300.

Figure 10:
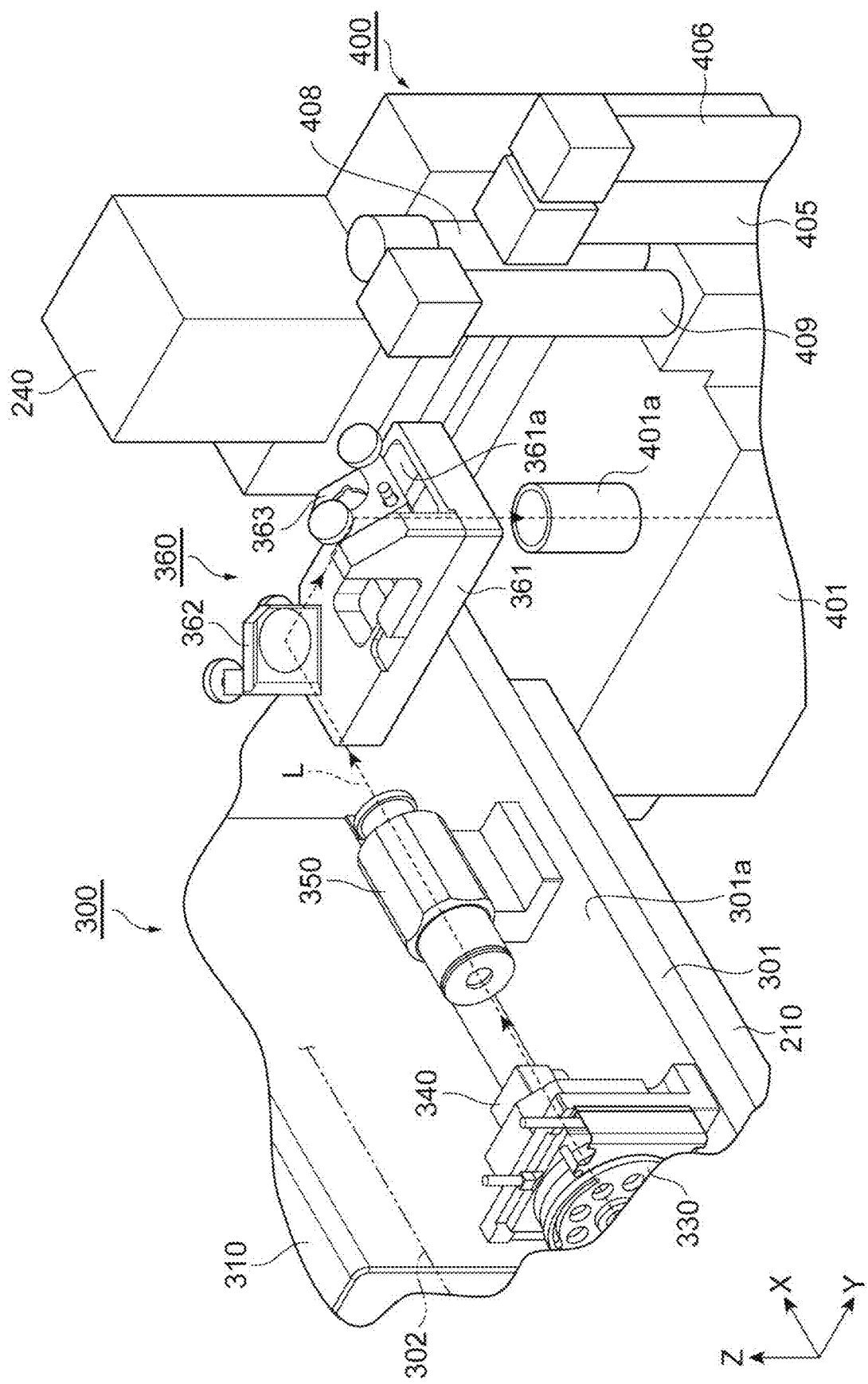
FIG. 10 is a perspective view of a part of the laser output unit and a laser converging unit in the laser processing device of FIG. 7.

As illustrated in FIG. 10, the laser converging unit 400 includes a housing 401. The housing 401 has a rectangular parallelepiped shape with the Y-axis direction as the longitudinal direction. The second moving mechanism 240 is attached to one side surface 401e of the housing 401 (see FIGS. 11 and 13). A cylindrical light entrance unit 401a is provided in the housing 401 so as to face the opening 361a of the mirror unit 360 in the Z-axis direction. The light entrance unit 401a allows the laser light L emitted from the laser output unit 300 to enter the housing 401. The mirror unit 360 and the light entrance unit 401a are separated from each other by a distance in which mutual contact does not occur when the laser converging unit 400 is moved along the Z-axis direction by the second moving mechanism 240.

Figure 11:
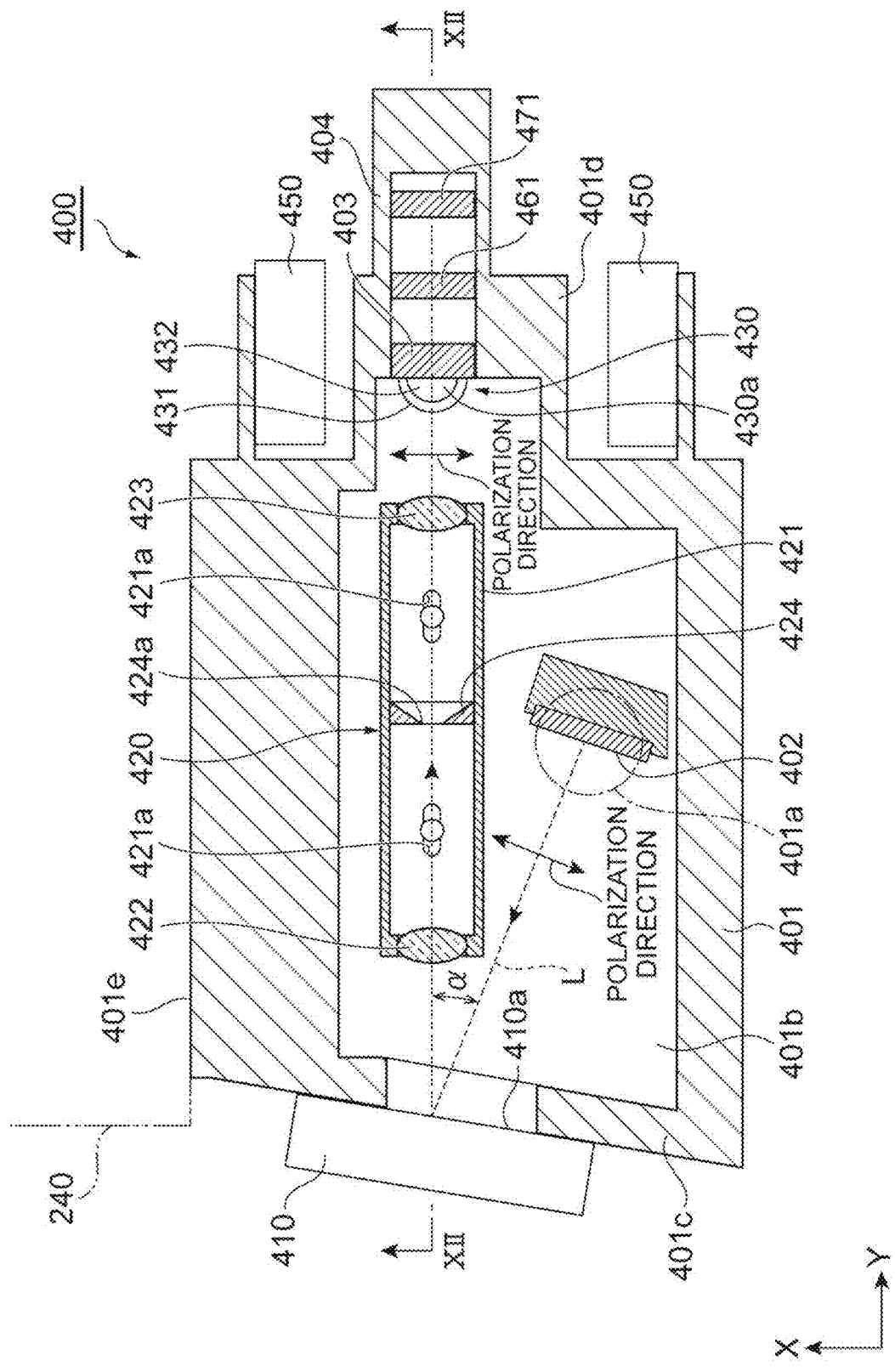
FIG. 11 is a sectional view of the laser converging unit taken along the XY plane of FIG. 7.

As illustrated in FIGS. 11 and 12, the laser converging unit 400 includes a mirror 402 and a dichroic mirror 403. Further, the laser converging unit 400 includes a reflective spatial light modulator 410, a 4f lens unit 420, a converging lens unit (objective lens) 430, a drive mechanism 440, and a pair of distance measuring sensors 450.

The mirror 402 is attached to a bottom surface 401b of the housing 401 so as to face the light entrance unit 401a in the Z-axis direction. The mirror 402 reflects the laser light L entering the housing 401 via the light entrance unit 401a in a direction parallel to the XY plane. The laser light L collimated by the beam expander 350 of the laser output unit 300 enters the mirror 402 along the Z-axis direction. That is, the laser light L as parallel light enters the mirror 402 along the Z-axis direction. For that reason, even if the laser converging unit 400 is moved along the Z-axis direction by the second moving mechanism 240, a constant state of the laser light L entering the mirror 402 along the Z-axis direction is maintained. The laser light L reflected by the mirror 402 enters the reflective spatial light modulator 410.

The reflective spatial light modulator 410 is attached to an end 401c of the housing 401 in the Y-axis direction in a state where the reflective surface 410a faces the inside of the housing 401. The reflective spatial light modulator 410 is, for example, a reflective liquid crystal (liquid crystal on silicon (LCOS)) spatial light modulator (SLM), and reflects the laser light L in the Y-axis direction while modulating the laser light L. The laser light L modulated and reflected by the reflective spatial light modulator 410 enters the 4f lens unit 420 along the Y-axis direction. Here, in a plane parallel to the XY plane, an angle α formed by an optical axis of the laser light L entering the reflective spatial light modulator 410 and an optical axis of the laser light L emitted from the reflective spatial light modulator 410, is an acute angle (for example, from 10° to 60°). That is, the laser light L is reflected at an acute angle along the XY plane in the reflective spatial light modulator 410. This is for suppressing an incident angle and a reflection angle of the laser light L to suppress the degradation of diffraction efficiency, and for sufficiently exerting performance of the reflective spatial light modulator 410. Note that, in the reflective spatial light modulator 410, for example, the thickness of a light modulation layer in which a liquid crystal is used is extremely thin as several micrometers to several tens of micrometers, so that the reflective surface 410a can be regarded as substantially the same as a light entering and exiting surface of the light modulation layer.

The 4f lens unit 420 includes a holder 421, a lens 422 on the reflective spatial light modulator 410 side, a lens 423 on the converging lens unit 430 side, and a slit member 424. The holder 421 holds a pair of the lenses 422 and 423 and the slit member 424. The holder 421 maintains a constant mutual positional relationship between the pair of lenses 422 and 423 and the slit member 424 in a direction along the optical axis of the laser light L. The pair of lenses 422 and 423 constitutes a double telecentric optical system in which the reflective surface 410a of the reflective spatial light modulator 410 and an entrance pupil plane (pupil plane) 430a of the converging lens unit 430 are in an imaging relationship.

Thus, an image of the laser light L on the reflective surface 410a of the reflective spatial light modulator 410 (an image of the laser light L modulated in the reflective spatial light modulator 410) is transferred to (imaged on) the entrance pupil plane 430a of the converging lens unit 430. A slit 424a is formed in the slit member 424. The slit 424a is located between the lens 422 and the lens 423 and near a focal plane of the lens 422. Unnecessary part of the laser light L modulated and reflected by the reflective spatial light modulator 410 is blocked by the slit member 424. The laser light L having passed through the 4f lens unit 420 enters the dichroic mirror 403 along the Y-axis direction.

The dichroic mirror 403 reflects most (for example, from 95% to 99.5%) of the laser light L in the Z-axis direction and transmits part (for example, from 0.5% to 5%) of the laser light L along the Y-axis direction. Most of the laser light L is reflected at a right angle along the ZX plane in the dichroic mirror 403. The laser light L reflected by the dichroic mirror 403 enters the converging lens unit 430 along the Z-axis direction.

The converging lens unit 430 is attached to an end 401d (an end on the opposite side from the end 401c) of the housing 401 in the Y-axis direction via the drive mechanism 440. The converging lens unit 430 includes a holder 431 and a plurality of lenses 432. The holder 431 holds the plurality of lenses 432. The plurality of lenses 432 converges the laser light L at the object to be processed 1 (see FIG. 7) supported by the support table 230. The drive mechanism 440 moves the converging lens unit 430 along the Z-axis direction by driving force of a piezoelectric device.

The pair of distance measuring sensors 450 is attached to the end 401d of the housing 401 so as to be respectively located on both sides of the converging lens unit 430 in the X-axis direction. Each of the distance measuring sensors 450 emits light for distance measurement (for example, laser light) to the laser light entrance surface of the object to be processed 1 (see FIG. 7) supported by the support table 230, and detects the light for distance measurement reflected by the laser light entrance surface, thereby acquiring displacement data of the laser light entrance surface of the object to be processed 1. Note that, for the distance measuring sensors 450, sensors can be used of a triangulation method, a laser confocal method, a white confocal method, a spectral interference method, an astigmatism method, and the like.

In the laser processing device 200, as described above, the direction parallel to the X-axis direction is the processing direction (scanning direction of the laser light L). For that reason, when the converging point of the laser light L is relatively moved along each of the lines to cut 5a and 5b, out of the pair of distance measuring sensors 450, one of the distance measuring sensors 450 being relatively advanced with respect to the converging lens unit 430 acquires the displacement data of the laser light entrance surface of the object to be processed 1 along each of the lines to cut 5a and 5b. Then, the drive mechanism 440 moves the converging lens unit 430 along the Z-axis direction on the basis of the displacement data acquired by the distance measuring sensors 450 such that a constant distance is maintained between the laser light entrance surface of the object to be processed 1 and the converging point of the laser light L.

The laser converging unit 400 includes a beam splitter 461, a pair of lenses 462 and 463, and a profile acquisition camera (intensity distribution acquisition unit) 464. The beam splitter 461 divides the laser light L transmitted through the dichroic mirror 403 into a reflection component and a transmission component. The laser light L reflected by the beam splitter 461 sequentially enters the pair of lenses 462 and 463 and the profile acquisition camera 464 along the Z-axis direction. The pair of lenses 462 and 463 constitutes a double telecentric optical system in which the entrance pupil plane 430a of the converging lens unit 430 and an imaging surface of the profile acquisition camera 464 are in an imaging relationship. Thus, an image of the laser light L on the entrance pupil plane 430a of the converging lens unit 430 is transferred to (imaged on) the imaging surface of the profile acquisition camera 464. As described above, the image of the laser light L on the entrance pupil plane 430a of the converging lens unit 430 is the image of the laser light L modulated in the reflective spatial light modulator 410. Therefore, in the laser processing device 200, an imaging result by the profile acquisition camera 464 is monitored, whereby an operation state of the reflective spatial light modulator 410 can be grasped.

Further, the laser converging unit 400 includes a beam splitter 471, a lens 472, and a camera 473 for monitoring an optical axis position of the laser light L. The beam splitter 471 divides the laser light L transmitted through the beam splitter 461 into a reflection component and a transmission component. The laser light L reflected by the beam splitter 471 sequentially enters the lens 472 and the camera 473 along the Z-axis direction. The lens 472 converges the entering laser light L on an imaging surface of the camera 473. In the laser processing device 200, while an imaging result by each of the cameras 464 and 473 is monitored, in the mirror unit 360, the position adjustment of the support base 361 with respect to the mounting base 301, the position adjustment of the mirror 363 with respect to the support base 361, and the angle adjustment of the reflective surface of each of the mirrors 362 and 363 are performed (see FIGS. 9 and 10), whereby a shift can be corrected of the optical axis of the laser light L entering the converging lens unit 430 (a positional shift of intensity distribution of the laser light with respect to the converging lens unit 430, and an angular shift of the optical axis of the laser light L with respect to the converging lens unit 430).

The plurality of beam splitters 461 and 471 is arranged in a cylindrical body 404 extending along the Y-axis direction from the end 401d of the housing 401. The pair of lenses 462 and 463 is arranged in a cylindrical body 405 erected on the cylindrical body 404 along the Z-axis direction, and the profile acquisition camera 464 is arranged at an end of the cylindrical body 405. The lens 472 is arranged in a cylindrical body 406 erected on the cylindrical body 404 along the Z-axis direction, and the camera 473 is arranged at an end of the cylindrical body 406. The cylindrical body 405 and the cylindrical body 406 are arranged side by side in the Y-axis direction. Note that, the laser light L transmitted through the beam splitter 471 may be absorbed by a damper or the like provided at an end of the cylindrical body 404, or may be used for an appropriate purpose.

Figure 13:
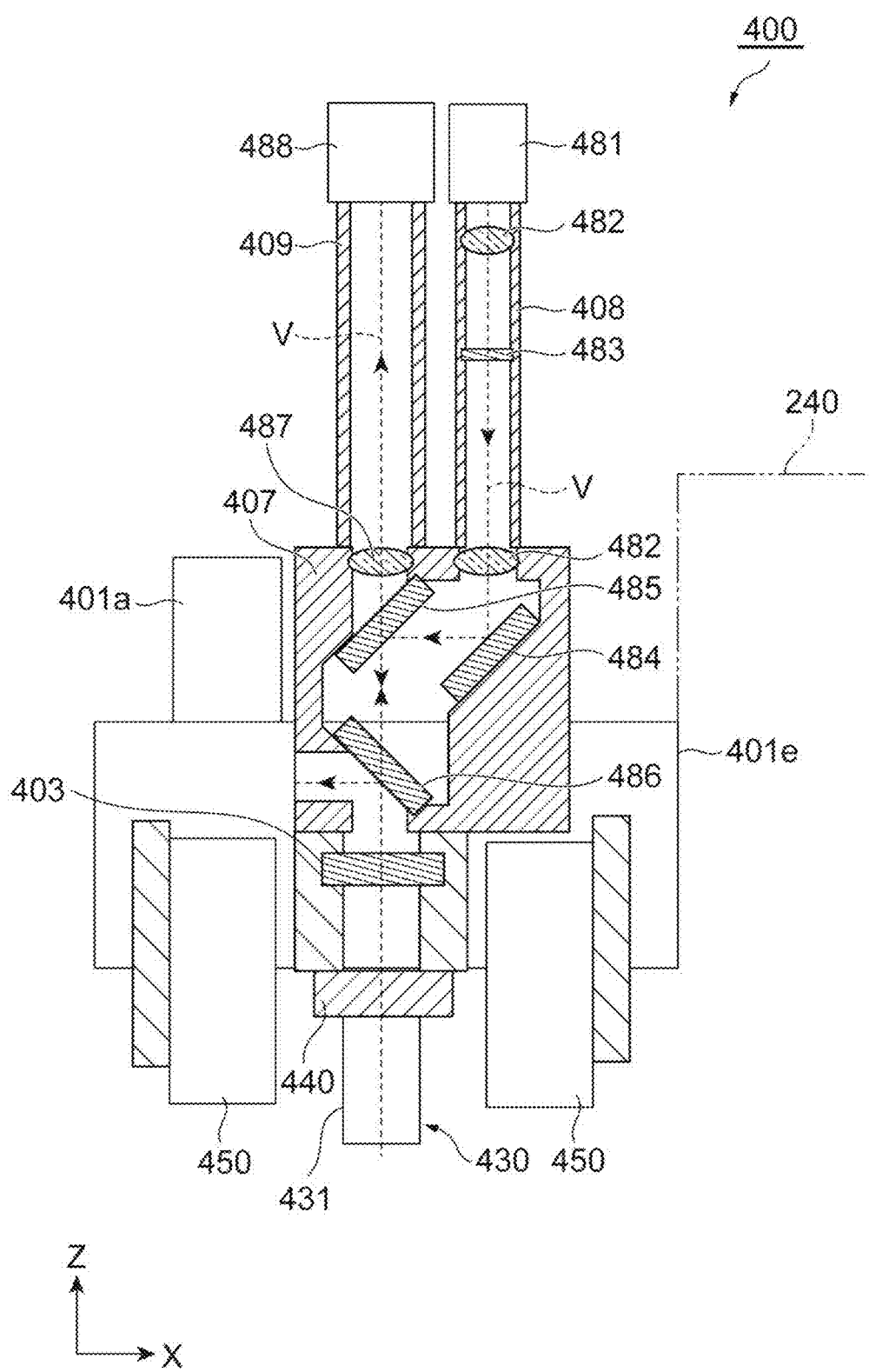
FIG. 13 is a sectional view of the laser converging unit taken along the line XIII-XIII of FIG. 12.

As illustrated in FIGS. 12 and 13, the laser converging unit 400 includes a visible light source 481, a plurality of lenses 482, a reticle 483, a mirror 484, a semitransparent mirror 485, a beam splitter 486, a lens 487, and an observation camera 488. The visible light source 481 emits visible light V along the Z-axis direction. The plurality of lenses 482 collimates the visible light V emitted from the visible light source 481. The reticle 483 gives a scale line to the visible light V. The mirror 484 reflects the visible light V collimated by the plurality of lenses 482 in the X-axis direction. The semitransparent mirror 485 divides the visible light V reflected by the mirror 484 into a reflection component and a transmission component. The visible light V reflected by the semitransparent mirror 485 is sequentially transmitted through the beam splitter 486 and the dichroic mirror 403 along the Z-axis direction, and is emitted via the converging lens unit 430 to the object to be processed 1 supported by the support table 230 (see FIG. 7).

The visible light V emitted to the object to be processed 1 is reflected by the laser light entrance surface of the object to be processed 1, enters the dichroic mirror 403 via the converging lens unit 430, and is transmitted through the dichroic mirror 403 along the Z-axis direction. The beam splitter 486 divides the visible light V transmitted through the dichroic mirror 403 into a reflection component and a transmission component. The visible light V transmitted through the beam splitter 486 is transmitted through the semitransparent mirror 485 and sequentially enters the lens 487 and the observation camera 488 along the Z-axis direction. The lens 487 converges the entering visible light V on an imaging surface of the observation camera 488. In the laser processing device 200, an imaging result by the observation camera 488 is observed, whereby a state of the object to be processed 1 can be grasped.

The mirror 484, the semitransparent mirror 485, and the beam splitter 486 are arranged in a holder 407 attached on the end 401d of the housing 401. The plurality of lenses 482 and the reticle 483 are arranged in a cylindrical body 408 erected on the holder 407 along the Z-axis direction, and the visible light source 481 is arranged at an end of the cylindrical body 408. The lens 487 is arranged in a cylindrical body 409 erected on the holder 407 along the Z-axis direction, and the observation camera 488 is arranged at an end of the cylindrical body 409. The cylindrical body 408 and the cylindrical body 409 are arranged side by side in the X-axis direction. Note that, each of the visible light V transmitted through the semitransparent mirror 485 along the X-axis direction and the visible light V reflected in the X-axis direction by the beam splitter 486 may be absorbed by a damper or the like provided on a wall portion of the holder 407, or may be used for an appropriate purpose.

In the laser processing device 200, replacement of the laser output unit 300 is assumed. This is because the wavelength of the laser light L suitable for processing varies depending on the specifications of the object to be processed 1, processing conditions, and the like. For that reason, a plurality of the laser output units 300 is prepared having respective wavelengths of emitting laser light L different from each other. Here, prepared are the laser output unit 300 in which the wavelength of the emitting laser light L is included in the wavelength band of from 500 nm to 550 nm, the laser output unit 300 in which the wavelength of the emitting laser light L is included in the wavelength band of from 1000 nm to 1150 nm, and the laser output unit 300 in which the wavelength of the emitting laser light L is included in the wavelength band of from 1300 nm to 1400 nm.

On the other hand, in the laser processing device 200, replacement of the laser converging unit 400 is not assumed. This is because the laser converging unit 400 is adapted to multiple wavelengths (adapted to a plurality of wavelength bands non-contiguous with each other). Specifically, the mirror 402, the reflective spatial light modulator 410, the pair of lenses 422 and 423 of the 4f lens unit 420, the dichroic mirror 403, the lens 432 of the converging lens unit 430, and the like are adapted to the multiple wavelengths.

Here, the laser converging unit 400 is adapted to the wavelength bands of from 500 nm to 550 nm, from 1000 nm to 1150 nm, and from 1300 nm to 1400 nm. This is implemented by designing the components of the laser converging unit 400 so as to satisfy desired optical performance, such as coating the components of the laser converging unit 400 with a predetermined dielectric multilayer film. Note that, in the laser output unit 300, the λ/2 wave plate unit 330 includes a λ/2 wave plate, and the polarizing plate unit 340 includes a polarizing plate. The λ/2 wave plate and the polarizing plate are optical devices having high wavelength dependence. For that reason, the λ/2 wave plate unit 330 and the polarizing plate unit 340 are provided in the laser output unit 300 as different components for each wavelength band.

[Optical Path and Polarization Direction of Laser Light in Laser Processing Device]

In the laser processing device 200, as illustrated in FIG. 11, the polarization direction of the laser light L converged at the object to be processed 1 supported by the support table 230 is a direction parallel to the X-axis direction, and coincides with the processing direction (scanning direction of the laser light L). Here, in the reflective spatial light modulator 410, the laser light L is reflected as P-polarized light. This is because in a case where a liquid crystal is used for the light modulation layer of the reflective spatial light modulator 410, when the liquid crystal is oriented such that the liquid crystal molecules are inclined in a surface parallel to the plane including the optical axis of the laser light L entering and exiting the reflective spatial light modulator 410, phase modulation is applied to the laser light L in a state where the rotation of the plane of polarization is suppressed (for example, see Japanese Patent No. 3878758).

On the other hand, in the dichroic mirror 403, the laser light L is reflected as S-polarized light. This is because, for example, when the laser light L is reflected as the S-polarized light rather than when the laser light L is reflected as the P-polarized light, the number of coatings is reduced of the dielectric multilayer film for making the dichroic mirror 403 adapt to the multiple wavelengths, and designing of the dichroic mirror 403 becomes easier.

Therefore, in the laser converging unit 400, the optical path from the mirror 402 via the reflective spatial light modulator 410 and the 4f lens unit 420 to the dichroic mirror 403 is set along the XY plane, and the optical path from the dichroic mirror 403 to the converging lens unit 430 is set along the Z-axis direction.

As illustrated in FIG. 9, in the laser output unit 300, the optical path of the laser light L is set along the X-axis direction or the Y-axis direction. Specifically, the optical path from the laser oscillator 310 to the mirror 303, and the optical path from the mirror 304 via the λ/2 wave plate unit 330, the polarizing plate unit 340, and the beam expander 350 to the mirror unit 360 are set along the X-axis direction, and the optical path from the mirror 303 via the shutter 320 to the mirror 304, and the optical path from the mirror 362 to the mirror 363 in the mirror unit 360 are set along the Y-axis direction.

Here, as illustrated in FIG. 11, the laser light L having traveled to the laser converging unit 400 from the laser output unit 300 along the Z-axis direction is reflected by the mirror 402 in a direction parallel to the XY plane, and enters the reflective spatial light modulator 410. At this time, in the plane parallel to the XY plane, an acute angle α is formed by the optical axis of the laser light L entering the reflective spatial light modulator 410 and the optical axis of the laser light L emitted from the reflective spatial light modulator 410. On the other hand, as described above, in the laser output unit 300, the optical path of the laser light L is set along the X-axis direction or the Y-axis direction.

Therefore, in the laser output unit 300, it is necessary to cause the λ/2 wave plate unit 330 and the polarizing plate unit 340 to function not only as the output adjusting unit configured to adjust the output of the laser light L but also as the polarization direction adjusting unit configured to adjust the polarization direction of the laser light L.

[Reflective Spatial Light Modulator]

Figure 14:
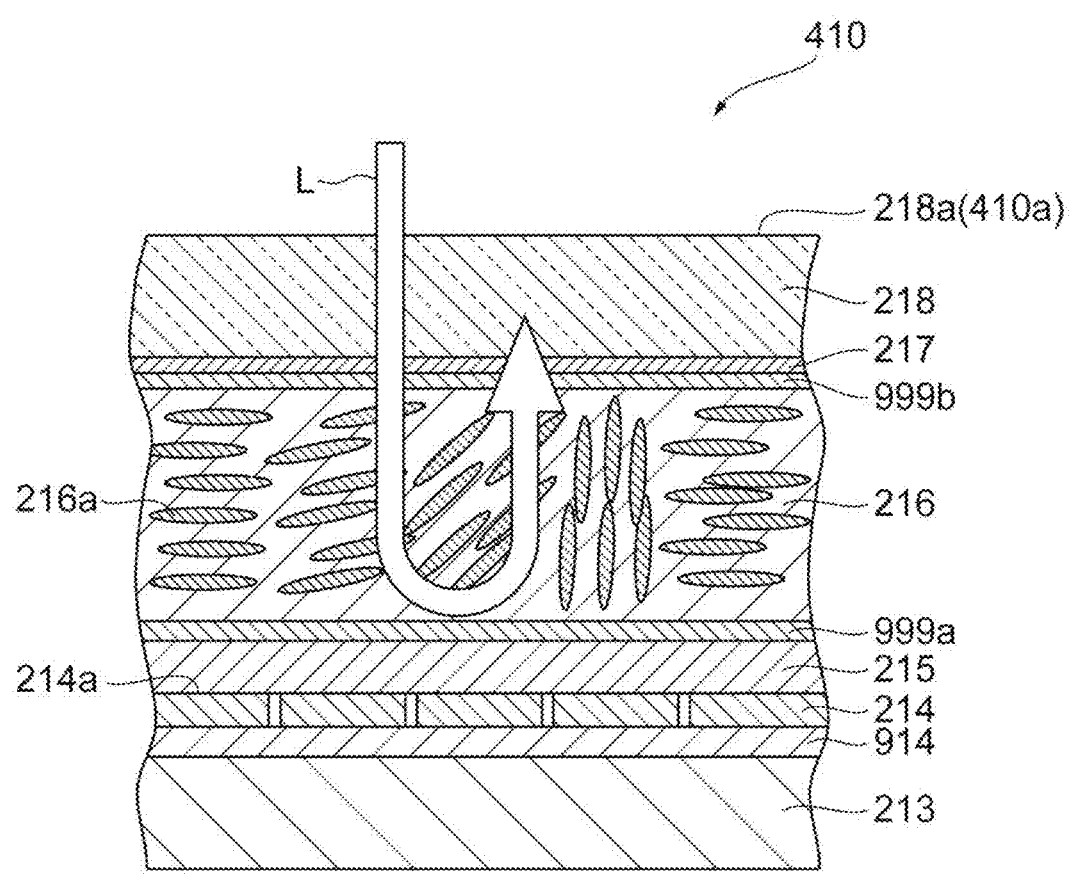
FIG. 14 is a partial sectional view of a reflective spatial light modulator in the laser processing device of FIG. 7.

As illustrated in FIG. 14, the reflective spatial light modulator 410 includes a silicon substrate 213, a drive circuit layer 914, a plurality of pixel electrodes 214, a reflective film 215 such as a dielectric multilayer mirror, an alignment film 999a, a liquid crystal layer (display) 216, an alignment film 999b, a transparent conductive film 217, and a transparent substrate 218 such as a glass substrate, which are layered in that order.

The transparent substrate 218 has a front surface 218a, and the front surface 218a forms the reflective surface 410a of the reflective spatial light modulator 410. The transparent substrate 218 is made of a light transmitting material such as glass, for example, and transmits the laser light L having a predetermined wavelength and entering from the front surface 218a of the reflective spatial light modulator 410 to the inside of the reflective spatial light modulator 410. The transparent conductive film 217 is formed on a back surface of the transparent substrate 218, and includes a conductive material (for example, ITO) that transmits the laser light L therethrough.

The plurality of pixel electrodes 214 is arranged in a matrix on the silicon substrate 213 along the transparent conductive film 217. Each pixel electrode 214 is made of a metal material such as aluminum, for example, while its front surface 214a is processed flat and smooth. The plurality of pixel electrodes 214 is driven by an active matrix circuit provided in the drive circuit layer 914.

The active matrix circuit is provided between the plurality of pixel electrodes 214 and the silicon substrate 213, and controls an applied voltage to each of the pixel electrodes 214 in accordance with a light image to be output from the reflective spatial light modulator 410. Such an active matrix circuit includes a first driver circuit configured to control the applied voltage for pixel rows arranged in the X-axis direction, and a second driver circuit configured to control the applied voltage for pixel rows arranged in the Y-axis direction, which are not illustrated, for example, and a predetermined voltage is applied to the pixel electrode 214 of a pixel specified by the driver circuits, by a spatial light modulator controller 502 (see FIG. 16) in the controller 500 to be described later.

The alignment films 999a, 999b are arranged on both end surfaces of the liquid crystal layer 216, respectively, so as to align a group of liquid crystal molecules in a fixed direction. The alignment films 999a, 999b are made of a polymer material such as polyimide, of which surfaces coming into contact with the liquid crystal layer 216 are subjected to rubbing, and the like.

The liquid crystal layer 216 is arranged between the plurality of pixel electrodes 214 and the transparent conductive film 217 and modulates the laser light L according to an electric field formed between each pixel electrode 214 and the transparent conductive film 217. That is, when a voltage is applied to the pixel electrodes 214 by the active matrix circuit of the drive circuit layer 914, an electric field is formed between the transparent conductive film 217 and the pixel electrodes 214, and the alignment direction of liquid crystal molecules 216a changes according to a magnitude of the electric field formed in the liquid crystal layer 216. When the laser light L enters the liquid crystal layer 216 through the transparent substrate 218 and the transparent conductive film 217, the laser light L is modulated by the liquid crystal molecules 216a while passing through the liquid crystal layer 216, and reflected by the reflective film 215, and then modulated again by the liquid crystal layer 216, and emitted.

At this time, the voltage applied to each of the pixel electrodes 214 is controlled by the spatial light modulator controller 502 (see FIG. 16) to be described later, and, in accordance with the voltage, a refractive index changes in a portion sandwiched between the transparent conductive film 217 and each of the pixel electrodes 214 in the liquid crystal layer 216 (the refractive index changes of the liquid crystal layer 216 at a position corresponding to each pixel). Due to the change in the refractive index, the phase of the laser light L can be changed for each pixel of the liquid crystal layer 216 in accordance with the voltage applied. That is, phase modulation corresponding to the hologram pattern can be applied by the liquid crystal layer 216 for each pixel.

In other words, a modulation pattern as the hologram pattern applying the modulation can be displayed on the liquid crystal layer 216 of the reflective spatial light modulator 410. The wavefront is adjusted of the laser light L that enters and is transmitted through the modulation pattern, and shifts occur in phases of components of individual rays constituting the laser light L in a predetermined direction orthogonal to their traveling direction. Therefore, the laser light L can be modulated (for example, intensity, amplitude, phase, and polarization of the laser light L can be modulated) by appropriately setting the modulation pattern to be displayed in the reflective spatial light modulator 410.

[4f Lens Unit]

Figure 15:
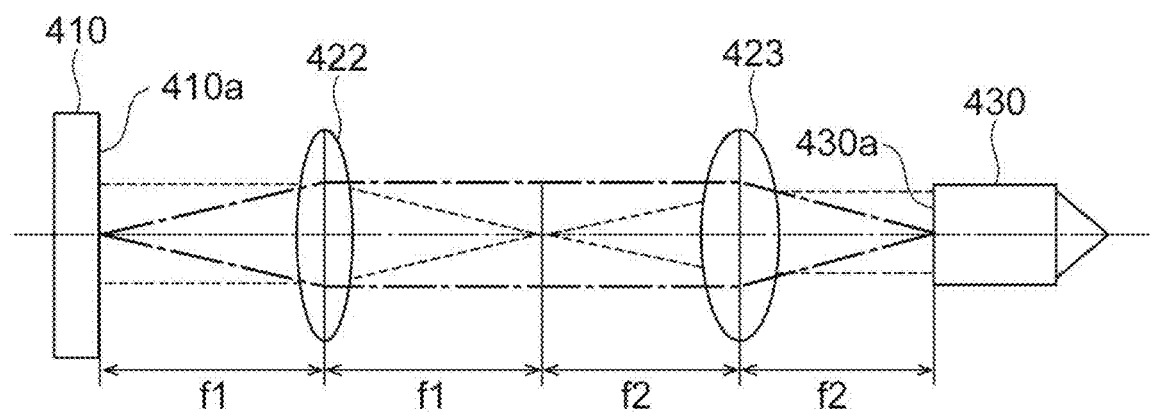
FIG. 15 is a diagram illustrating an optical arrangement relationship among a reflective spatial light modulator, a 4f lens unit, and a converging lens unit in the laser converging unit of FIG. 11.

As described above, the pair of lenses 422 and 423 of the 4f lens unit 420 constitutes the double telecentric optical system in which the reflective surface 410a of the reflective spatial light modulator 410 and the entrance pupil plane 430a of the converging lens unit 430 are in the imaging relationship. Specifically, as illustrated in FIG. 15, the distance of the optical path between the center of the lens 422 on the reflective spatial light modulator 410 side and the reflective surface 410a of the reflective spatial light modulator 410 is a first focal length f1 of the lens 422, the distance of the optical path between the center of the lens 423 on the converging lens unit 430 side and the entrance pupil plane 430a of the converging lens unit 430 is a second focal length f2 of the lens 423, and the distance of the optical path between the center of the lens 422 and the center of the lens 423 is a sum of the first focal length f1 and the second focal length f2 (that is, f1+f2). In the optical path from the reflective spatial light modulator 410 to the converging lens unit 430, the optical path between the pair of lenses 422 and 423 is a straight line.

In the laser processing device 200, from a viewpoint of increasing an effective diameter of the laser light L on the reflective surface 410a of the reflective spatial light modulator 410, a magnification M of the double telecentric optical system satisfies 0.5<M<1 (reduction system). As the effective diameter is increased of the laser light L on the reflective surface 410a of the reflective spatial light modulator 410, the laser light L is modulated with a high-precision phase pattern. From a viewpoint of inhibiting the optical path from becoming longer of the laser light L from the reflective spatial light modulator 410 to the converging lens unit 430, it is possible to set 0.6≤M≤0.95. Here, (the magnification M of the double telecentric optical system)=(the size of the image on the entrance pupil plane 430a of the converging lens unit 430)/(the size of the object on the reflective surface 410a of the reflective spatial light modulator 410). In the case of the laser processing device 200, the magnification M of the double telecentric optical system, the first focal length f1 of the lens 422, and the second focal length f2 of the lens 423 satisfy M=f2/f1.

From a viewpoint of reducing the effective diameter of the laser light L on the reflective surface 410a of the reflective spatial light modulator 410, the magnification M of the double telecentric optical system may satisfy 1<M<2 (enlargement system). As the effective diameter is reduced of the laser light L on the reflective surface 410a of the reflective spatial light modulator 410, the magnification can be reduced of the beam expander 350 (see FIG. 9), and in the plane parallel to the XY plane, the angle α (see FIG. 11) is reduced formed by the optical axis of the laser light L entering the spatial light modulator 410 and the optical axis of the laser light L emitted from the reflective spatial light modulator 410. From the viewpoint of inhibiting the optical path from becoming longer of the laser light L from the reflective spatial light modulator 410 to the converging lens unit 430, it is possible to set 1.05≤M≤1.7.

Next, a main part of a laser processing device 200 according to a first embodiment will be described in detail.

Figure 16:
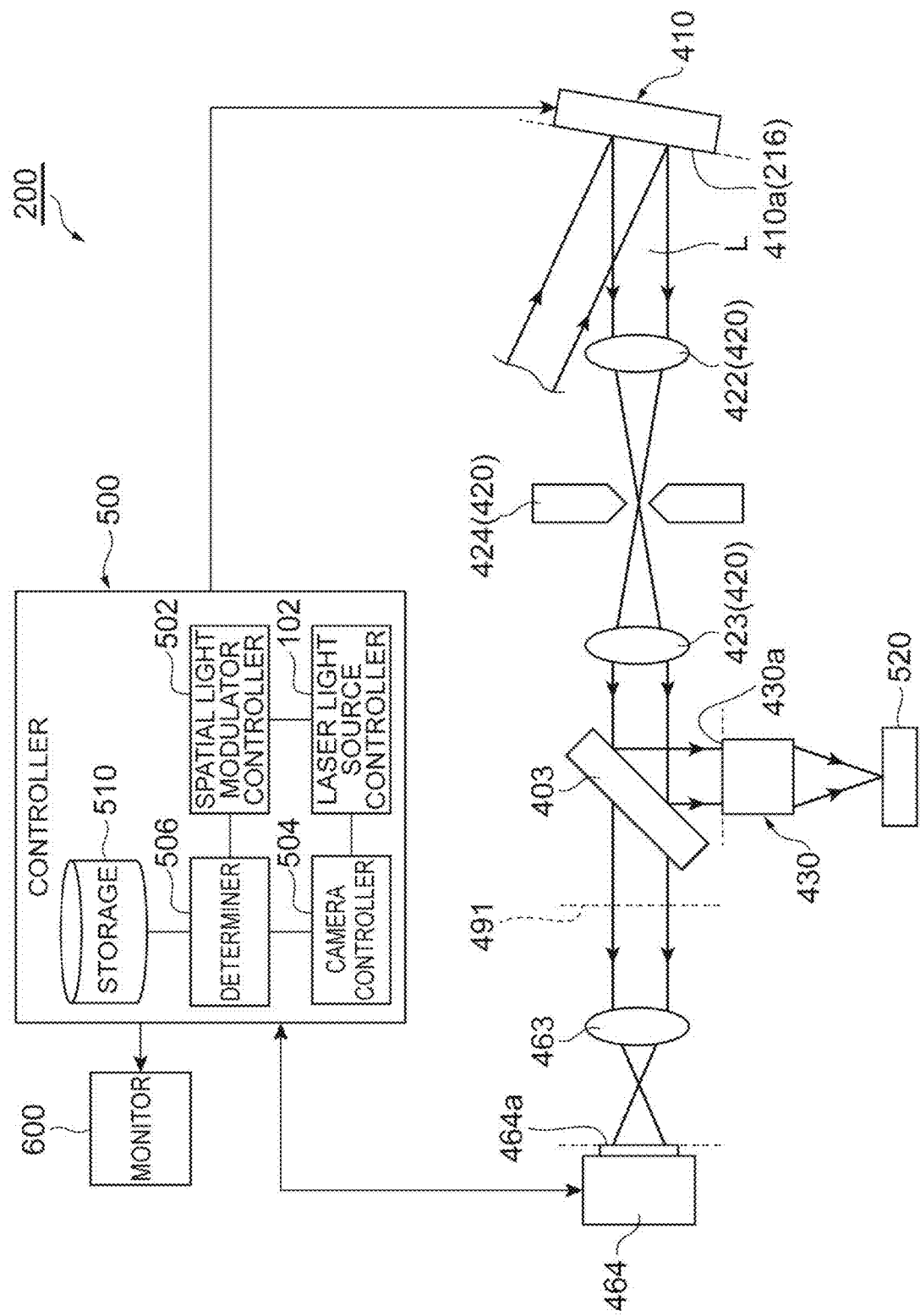
FIG. 16 is a schematic configuration diagram illustrating a main part of a laser processing device according to a first embodiment.

FIG. 16 is a schematic configuration diagram illustrating the main part of the laser processing device 200 according to the first embodiment. As illustrated in FIG. 16, laser light L output from a laser output unit 300 (laser oscillator 310) enters a reflective spatial light modulator 410. The reflective spatial light modulator 410 modulates the entering laser light L according to a phase pattern displayed on a liquid crystal layer 216, and emits the modulated laser light. The laser light L emitted from the reflective spatial light modulator 410 is focused by a lens (focusing lens) 422 that is a relay lens of a 4f lens unit 420, and then collimated by a lens 423 that is a relay lens of the 4f lens unit 420 to enter a dichroic mirror 403. The laser light L entering the dichroic mirror 403 is branched into reflection light and transmission light. The laser light L reflected by the dichroic mirror 403 enters a converging lens unit 430.

That is, the laser processing device 200 includes the lens 422 arranged between the reflective spatial light modulator 410 and the converging lens unit 430 in the optical path of the laser light L. The laser light L entering the converging lens unit 430 is converged by the converging lens unit 430. On the other hand, the laser light L transmitted through the dichroic mirror 403 is focused by the lens 463 that is a relay lens, and enters an imaging surface 464a of a profile acquisition camera 464.

A pair of lenses 422 and 423 relays the wavefront of the laser light L on a reflective surface 410a of the liquid crystal layer 216 to an entrance pupil plane 430a of the converging lens unit 430 and a conjugate plane 491 on the downstream side (rear stage) of the dichroic mirror 403. The lens 463 relays (images) the wavefront of the laser light L (the real image in the liquid crystal layer 216) relayed to the conjugate plane 491 by the pair of lenses 422 and 423 onto the imaging surface 464a of the profile acquisition camera 464. Thus, the liquid crystal layer 216, the entrance pupil plane 430a of the converging lens unit 430, the conjugate plane 491, and the imaging surface 464a of the profile acquisition camera 464 are conjugate with each other. That is, the laser processing device 200 includes the imaging surface 464a conjugate with the entrance pupil plane 430a of the converging lens unit 430, and also includes the profile acquisition camera 464 configured to obtain an image of the laser light L.

The profile acquisition camera 464 is an imaging device configured to obtain intensity distribution of the laser light L branched by the dichroic mirror 403. Specifically, the profile acquisition camera 464 captures, as a still image, an image (intensity distribution image) associated with the intensity distribution of the beam cross section of the laser light L emitted from the reflective spatial light modulator 410 and before entering the converging lens unit 430. The captured intensity distribution image is output to a controller 500. Examples of the profile acquisition camera 464 used include a complementary metal oxide semiconductor (CMOS) image sensor.

A slit member 424 is arranged at the focal position on the rear side of the lens 422 in the optical path of the laser light L. The slit member 424 shields a spatial frequency component (wide-angle diffracted light) of a certain value or more in the laser light L, and allows a spatial frequency component less than the certain value in the laser light L to pass. For example, in the slit member 424, a size of an opening is set such that the spatial frequency component of the certain value or more is shielded. For example, in a case where a phase pattern including a diffraction lattice pattern is displayed on the reflective spatial light modulator 410 (liquid crystal layer 216), the slit member 424 blocks diffracted light (for example, positive and negative high-order diffracted light) of the laser light L, which is diffracted in accordance with the diffraction lattice pattern, higher than a certain order.

Incidentally, the slit member 424 may be arranged near the focal position on the rear side of the lens 422. The area near the focal position is a range in the vicinity of the focal position, around the focal position, or a periphery of the focal position, in which the slit member 424 can shield the spatial frequency component of the certain value or more in the laser light L (range in which the diffracted light higher than the certain order can be blocked) (same applies hereinafter). In the laser light L having passed through the slit member 424, modulation of the laser light L by the reflective spatial light modulator 410 can be easily observed as intensity modulation.

The controller 500 includes a laser light source controller 102 mentioned above, a spatial light modulator controller (controller) 502, a camera controller 504, a determiner 506, and a storage 510. The laser light source controller 102 controls operation of the laser oscillator 310 as described above. In addition, the laser light source controller 102 determines and sets the output of the laser light L generated by the laser oscillator 310 on the basis of processing conditions (irradiation conditions) for each laser processing along one line to cut 5. The processing conditions are input by an operator from an input unit such as a touch panel, for example. Examples of the processing conditions include a depth position at which a modified region 7 within an object to be processed 1 is formed, and a laser output.

Here, the laser processing device 200 has at least a first mode in which laser processing is performed on the object to be processed 1 by irradiating the object to be processed 1 with the laser light L, and a second mode different from the first mode. The first mode is a processing mode as described above. The second mode is, for example, a measurement mode for measuring the intensity of the laser light L (for example, a calibration mode) before execution of the processing mode such as at start-up of the laser processing device 200 or during the processing mode such as at the time of replacement of the object to be processed 1. Switching of each mode of the laser processing device 200 may be performed manually by an operator's input, or may be performed automatically. As an example, at start-up of the laser processing device 200, the second mode may be automatically (forcibly) executed prior to the execution of the first mode.

The intensity of the laser light L can be measured using, for example, a power meter 520 arranged at the rear stage of the converging lens unit 430 in the optical path of the laser light L. The power meter 520 is arranged at, for example, the converging point of the laser light L emitted from the converging lens unit 430. Alternatively, the intensity of the laser light L may be measured by obtaining the intensity of the laser light L on the basis of an image of the laser light L (intensity distribution image) obtained by the profile acquisition camera 464 as described above. Furthermore, the intensity of the laser light L may be measured by obtaining the intensity of the laser light L on the basis of the imaging result of a camera 473 for monitoring an optical axis position described above. Information associated with the intensity of the laser light L is transmitted to the determiner 506.

The spatial light modulator controller 502 controls the phase pattern displayed on the liquid crystal layer 216 of the reflective spatial light modulator 410. In particular, when the second mode is being executed, the spatial light modulator controller 502 performs switching control for switching the phase pattern to be displayed on the reflective spatial light modulator 410. The switching control is control for transmitting, to the reflective spatial light modulator 410, a signal for switching the phase pattern displayed on the reflective spatial light modulator 410 from a certain phase pattern to another phase pattern. In addition, when the switching from the certain phase pattern to the other phase pattern is performed, the other phase pattern may be displayed after the display of the certain phase pattern is stopped, or the other phase pattern may be formed by, in a state where the certain phase pattern is displayed, further superimposing a pattern on the certain phase pattern.

Examples of the phase pattern displayed on the reflective spatial light modulator 410 include a phase pattern including an aberration correction pattern, a phase pattern including a diffraction lattice pattern, and a phase pattern including the aberration correction pattern and the diffraction lattice pattern (that is, a phase pattern in which the diffraction lattice pattern is superimposed on the aberration correction pattern). Note that one phase pattern is assumed in the case where no refractive index distribution is generated in the liquid crystal layer 216 (for example, in a case where no voltage is applied to a pixel electrode 214), that is, in the case of a pattern in which substantially no phase modulation is added to the laser light L.

Figure 17:
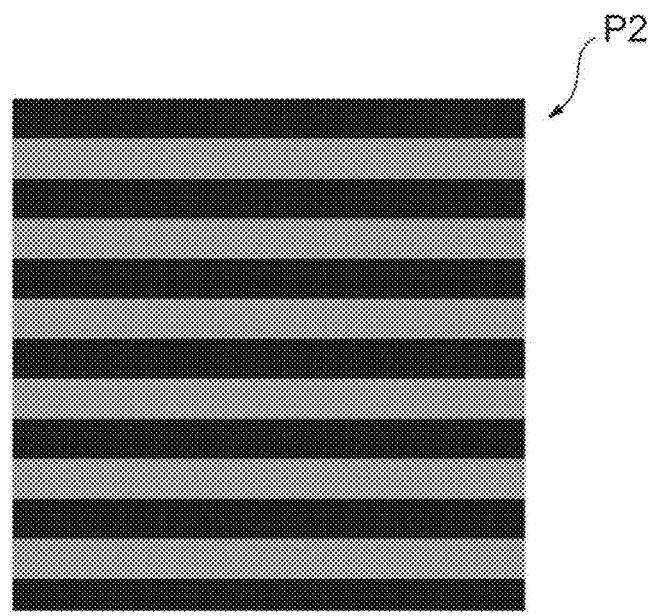
FIG. 17 is a view illustrating an exemplary diffraction lattice pattern and diffracted light.
Figure 17:
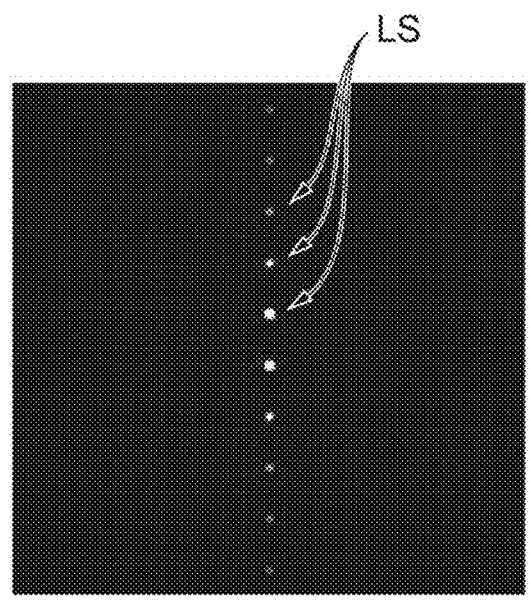

(a) of FIG. 17 illustrates an exemplary phase pattern that is a diffraction lattice pattern. When this phase pattern P2 is displayed on the reflective spatial light modulator 410, the laser light L emitted from the reflective spatial light modulator 410 is diffracted according to the phase pattern P2. Thus, as illustrated in (b) of FIG. 17, a plurality of beam spots LS corresponding to each diffracted light of the laser light L is formed at the converging position on the rear side of the lens 422. Therefore, by adjusting the shape of the slit 424a of the slit member 424, it is possible to block a part of the diffracted light (diffracted light higher than a certain order).

The camera controller 504 controls operation of the profile acquisition camera 464 and the camera 473 for monitoring an optical axis position. In addition, the camera controller 504 obtains an intensity distribution image from the profile acquisition camera 464 and the camera 473 to recognize it. Thus, the camera controller 504 can obtain the intensity of the laser light L. Information associated with the obtained intensity of the laser light L is transmitted to the determiner 506 as described above.

The determiner 506 determines, when the second mode is being executed, whether the operation of the reflective spatial light modulator 410 is normal. The state where the operation of the reflective spatial light modulator 410 is normal is a state where, for example, a desired phase pattern is displayed on the liquid crystal layer 216 when a drive circuit layer 914 applies a predetermined voltage to the pixel electrode 214 under the control of the spatial light modulator controller 502. This can be determined on the basis of the intensity of the laser light L emitted from the reflective spatial light modulator 410 via the liquid crystal layer 216.

That is, if the phase pattern displayed on the reflective spatial light modulator 410 changes between before and after the switching control of the phase pattern performed by the spatial light modulator controller 502, the intensity of the laser light L emitted from the reflective spatial light modulator 410 may change. On the other hand, if the phase pattern displayed on the reflective spatial light modulator 410 does not change between before and after the switching control of the phase pattern performed by the spatial light modulator controller 502, the intensity of the laser light L emitted from the reflective spatial light modulator 410 does not change. Therefore, it is possible to determine whether the operation of the reflective spatial light modulator 410 is normal on the basis of the determination of whether the intensity of the laser light L has changed between before and after the switching control.

That is, the determiner 506 determines whether the operation of the reflective spatial light modulator 410 is normal on the basis of the change in the intensity of the laser light L between before and after the switching control of the phase pattern performed by the spatial light modulator controller 502. This point will also be described later as an operation checking method of the reflective spatial light modulator 410.

The storage 510 stores a determination result of the determiner 506. Note that the storage 510 may store a plurality of phase patterns to be displayed on the reflective spatial light modulator 410 in advance, for example.

A monitor 600 is connected to the controller 500. The monitor 600 can display the determination result of the determiner 506 stored in the storage 510. In addition, the monitor 600 can display the phase pattern to be displayed on the reflective spatial light modulator 410 (liquid crystal layer 216) by the spatial light modulator controller 502, and the intensity distribution image obtained by the profile acquisition camera 464 and the camera 473. Note that the determination result of the determiner 506 may be displayed on the monitor 600 without passing through the storage 510.

Next, an operation checking method of the reflective spatial light modulator 410 of the laser processing device 200 will be described with reference to the flowchart of FIG. 18.

In the operation checking method according to the present embodiment, first, the controller 500 sets a mode of the laser processing device 200 to an operation checking mode (step S1). The operation checking mode is the second mode different from the first mode as the processing mode, which is the measurement mode of the intensity of the laser light L in this case. As an example, here, the controller 500 forcibly (automatically) sets the laser processing device 200 in the measurement mode at start-up of the laser processing device 200.

Next, the power meter 520 is arranged at the rear stage of the converging lens unit 430 in the optical path of the laser light L (for example, below the converging lens unit 430 in the Z-axis direction) (step S2). The power meter 520 is arranged at, for example, the converging point of the laser light emitted from the converging lens unit 430.

Next, under the control of the spatial light modulator controller 502, the reflective spatial light modulator 410 displays the phase pattern (step S3). More specifically, in this case, the spatial light modulator controller 502 transmits a signal to the drive circuit layer 914 to apply voltage to the pixel electrode 214, thereby causing the liquid crystal layer 216 to display the phase pattern. In step S3, the phase pattern displayed on the reflective spatial light modulator 410 is a first pattern not including the diffraction lattice pattern. The first pattern may include the aberration correction pattern, for example.

Next, under the control of the laser light source controller 102, the laser output unit 300 (laser oscillator 310) outputs the laser light L. The laser light L enters the power meter 520 via the reflective spatial light modulator 410 and the converging lens unit 430. Thus, the power meter 520 measures the intensity of the laser light L (step S4). The measurement result of the intensity is transmitted to the determiner 506.

Next, the spatial light modulator controller 502 performs switching control for switching the phase pattern displayed on the reflective spatial light modulator 410 (first step, step S5). More specifically, in this case, the spatial light modulator controller 502 transmits, to the reflective spatial light modulator 410, a signal by which the phase pattern is switched to a phase pattern different from the previously displayed first pattern to be displayed. In step S5, the phase pattern displayed on the reflective spatial light modulator 410 is a pattern different from the first pattern, which is a second pattern P2 including the diffraction lattice pattern (see (a) of FIG. 17). The second pattern P2 may further include the aberration correction pattern, for example.

Next, the power meter 520 again measures the intensity of the laser light L (step S6). When the reflective spatial light modulator 410 operates normally, the phase pattern displayed on the reflective spatial light modulator 410 is switched from the first pattern to the second pattern P2 including the diffraction lattice pattern. Therefore, the laser light L emitted from the reflective spatial light modulator 410 is diffracted in accordance with the diffraction lattice pattern. The diffracted light higher than a certain order in the diffracted light is blocked by the slit member 424, and does not enter the power meter 520. As a result, the measurement result of the intensity in step S4 and the measurement result of the intensity in step S6 are different from each other. The intensity measured in step S6 is smaller than the intensity measured in step S4. The measurement result of the intensity is transmitted to the determiner 506.

Next, the determiner 506 determines whether the operation of the reflective spatial light modulator 410 is normal on the basis of the change in the intensity of the laser light L between before the switching control and after the switching control (second step). More specifically, the determiner 506 calculates the intensity difference by subtracting the intensity measured in step S6 from the intensity measured in step S4 (second step, step S7). That is, in this case, the determiner 506 calculates the intensity difference by subtracting the intensity of the laser light L after the switching control from the intensity of the laser light L before the switching control. The determiner 506 then determines whether the intensity difference calculated in step S7 is larger than a preset threshold value (second step, step S8).

As described above, when the operation of the reflective spatial light modulator 410 is normal, the laser light L entering the reflective spatial light modulator 410 after the switching control is diffracted by the diffraction lattice pattern included in the second pattern P2, whereby the intensity of the laser light L becomes smaller than that before the switching control by a certain amount or more. Therefore, when the intensity difference between before and after the switching control is larger than the threshold value (Step S8: YES), it is specified that the operation of the reflective spatial light modulator 410 is normal. Accordingly, in the subsequent step, the controller 500 terminates the operation checking mode, and sets the mode of the laser processing device 200 to the processing mode (step S9).

On the other hand, when the intensity difference between before and after the switching control is equal to or less than the threshold value (step S8: NO), it is specified that the operation of the reflective spatial light modulator 410 is not normal (an error is detected). Accordingly, in the subsequent step, error processing of the reflective spatial light modulator 410 is performed (step S10). Examples of the error processing include processing of executing step S3 and subsequent steps again, and processing of terminating the operation of the laser processing device 200.

As described above, in the laser processing device 200 and the operation checking method thereof according to the present embodiment, the switching control of the phase pattern displayed on the reflective spatial light modulator 410 is performed when the second mode different from the first mode in which the laser processing is performed is being executed. When the operation of the reflective spatial light modulator 410 is normal, the laser light L is modulated by different phase patterns before and after the switching control, thereby generating the intensity change. On the other hand, when the operation of the reflective spatial light modulator 410 is not normal, the phase pattern may not be switched appropriately before and after the switching control, whereby the intensity change of the laser light L may not be generated. Therefore, when the second mode is being executed, it is determined whether the operation of the reflective spatial light modulator 410 is normal on the basis of the intensity change of the laser light L before and after the switching control, whereby it becomes possible to check the operation of the reflective spatial light modulator 410 at timing other than the time of processing.

In addition, in the laser processing device 200 and the operation checking method thereof, the spatial light modulator controller 502 performs, when the second mode is being executed, the switching control in which the phase pattern displayed on the reflective spatial light modulator 410 is switched from the first pattern to the second pattern including the diffraction lattice pattern. Then, the determiner 506 calculates the intensity difference by subtracting the intensity of the laser light L after the switching control from the intensity of the laser light L before the switching control, and determines whether the operation of the reflective spatial light modulator 410 is normal on the basis of the determination of whether the intensity difference is larger than the threshold value.

In this case, when the operation of the reflective spatial light modulator 410 is normal, the laser light L entering the reflective spatial light modulator 410 after the switching control is diffracted by the diffraction lattice pattern included in the second pattern. Therefore, paying attention to the intensity of a part of the diffracted light, it becomes smaller than the intensity of the laser light L before the switching control by a certain amount or more. Accordingly, by comparing the intensity difference before and after the switching control with a predetermined threshold value, it is possible to easily and reliably determine whether the operation of the reflective spatial light modulator 410 is normal.

In addition, the laser processing device 200 includes the lens 422, which is arranged between the reflective spatial light modulator 410 and the converging lens unit 430 in the optical path of the laser light L to converge the laser light L, and the slit member 424, which is arranged at the focal position on the rear side of the lens 422 in the optical path of the laser light L to block the diffracted light of the laser light L higher than a certain order diffracted in accordance with the diffraction lattice pattern. Accordingly, when the operation of the reflective spatial light modulator 410 is normal, the diffracted light higher than the certain order is blocked at the focal position, whereby the intensity difference before and after the switching control can be sufficiently generated. Therefore, it becomes possible to more easily and reliably determine whether the operation of the reflective spatial light modulator 410 is normal.

Furthermore, in the laser processing device 200 and the operation checking method thereof, the second mode is the measurement mode in which the intensity of the laser light L emitted from the converging lens unit 430 is measured. In addition, the determiner 506 makes determination on the basis of the intensity of the laser light L obtained by the power meter 520 arranged at the rear stage of the converging lens unit 430 in the optical path of the laser light L. Therefore, it becomes possible to check the operation of the reflective spatial light modulator 410 by using the measurement mode as a calibration mode performed as a normal operation.

Figure 19:
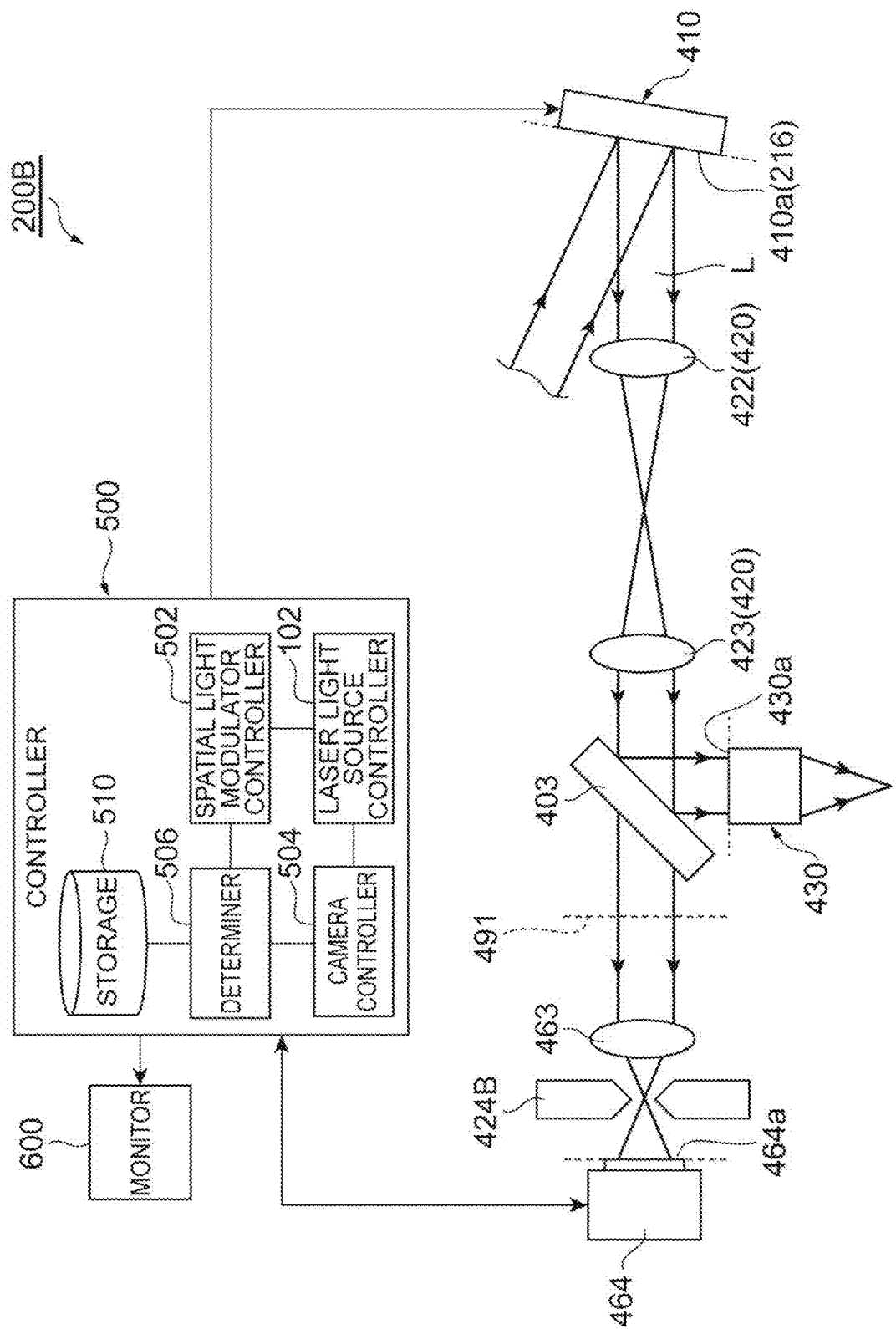
FIG. 19 is a schematic configuration diagram illustrating a main part of a laser processing device according to a second embodiment.

Next, a second embodiment will be described. FIG. 19 is a schematic configuration diagram illustrating a main part of a laser processing device 200B according to the second embodiment. As illustrated in FIG. 19, the laser processing device 200B according to the present embodiment is different from the laser processing device 200 (see FIG. 16) described above in that, in an optical path of laser light L, a slit member 424B is arranged at a focal position of a lens 463 that is a focusing lens arranged between a reflective spatial light modulator 410 and a profile acquisition camera 464. The slit member 424B is configured in a similar manner to the slit member 424 described above. Note that the slit member 424B may be arranged near the focal position of the lens 463.

In this case, while diffracted light of the laser light L emitted from the reflective spatial light modulator 410 enters the profile acquisition camera 464 via the slit member 424B, and enters a converging lens unit 430 without passing through the slit member. Therefore, in the profile acquisition camera 464, an image of the remainder of the laser light L in which the diffracted light higher than a certain order is blocked is obtained. In other words, the intensity difference of the laser light L between before and after the switching control may be larger in the profile acquisition camera 464 than in the rear stage of the converging lens unit 430. Therefore, in this case, a determiner 506 obtains the intensity of the laser light L on the basis of the image obtained by the profile acquisition camera 464, and makes the determination as described above on the basis of the obtained intensity. In this case, the operation of the reflective spatial light modulator 410 can be checked by using the configuration included in the laser processing device 200 in advance without using a power meter 520.

As described above, in the laser processing device 200B as well, in a similar manner to the laser processing device 200, it is possible to exert the effect in which the operation of the reflective spatial light modulator 410 can be checked at timing other than the time of processing.

Figure 20:
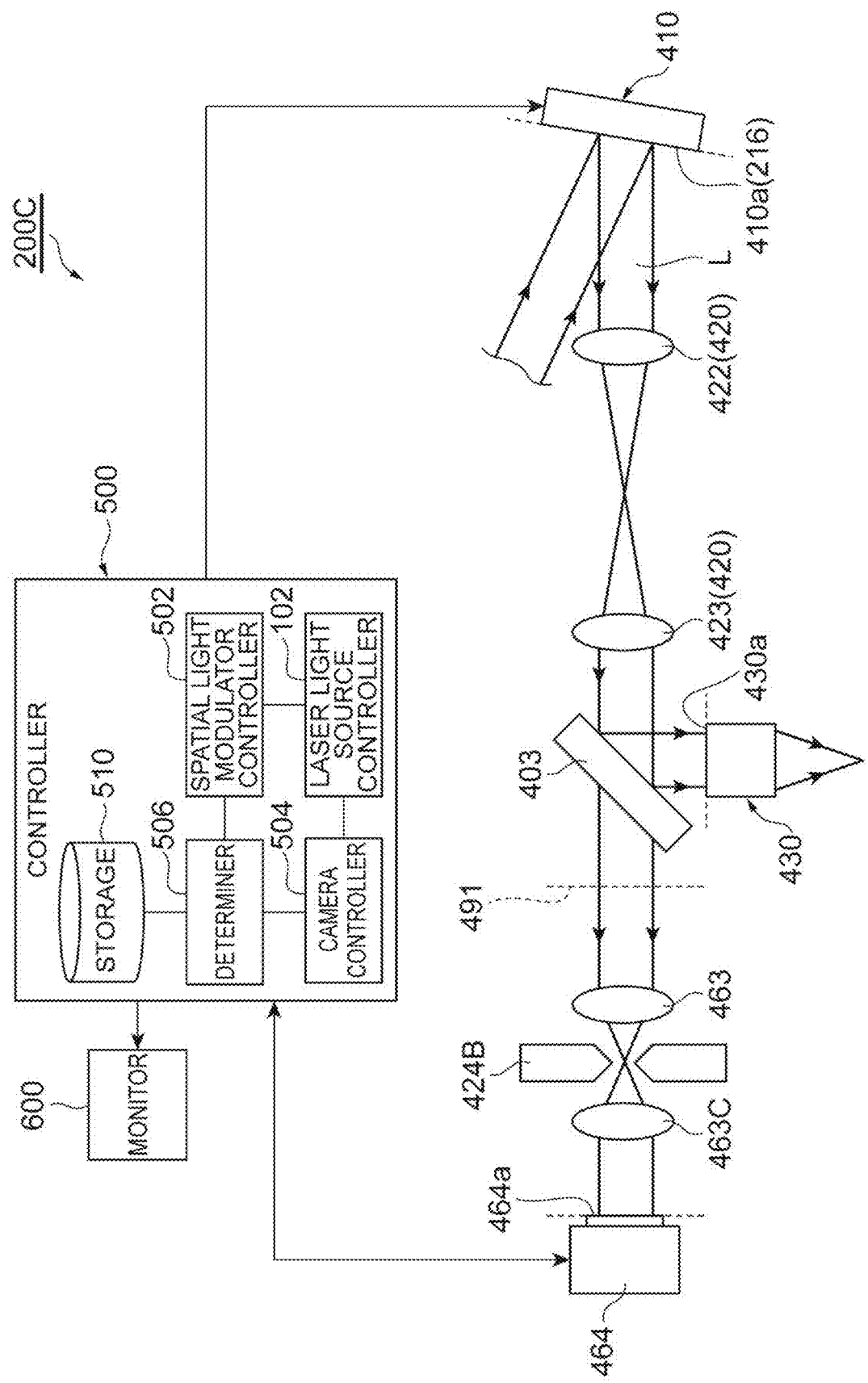
FIG. 20 is a schematic configuration diagram illustrating a main part of a laser processing device according to a variation of the second embodiment.

FIG. 20 is a schematic configuration diagram illustrating a main part of a laser processing device 200C according to a variation of the second embodiment. As illustrated in FIG. 20, as a variation of the second embodiment, the laser processing device 200C that includes a lens 463C between a lens 463 and a profile acquisition camera 464 in an optical path of laser light L can be employed. The lens 463C collimates the laser light L focused by the lens 463, and allows it to enter the profile acquisition camera 464. The lens 463C constitutes a relay lens. The lenses 463 and 463C relay (image) the wavefront of the laser light L (a real image in a liquid crystal layer 216) relayed to a conjugate plane 491 onto an imaging surface 464a of the profile acquisition camera 464.

Although the embodiment of one aspect of the present invention has been described above, the one aspect of the present invention is not limited the embodiment described above, and may be modified without departing from the gist described in each claim, or may be applied to other items.

For example, the above-described embodiment is not limited to one configured to form the modified region 7 within the object to be processed 1, and may be one configured to perform another laser processing such as ablation. The above-described embodiment is not limited to a laser processing device used for laser processing of converging the laser light L within the object to be processed 1, and may be a laser processing device used for laser processing of converging the laser light L at the front surface 1a, 3, or the back surface 1b of the object to be processed 1.

In the above-described embodiment, the imaging optical system constituting the double telecentric optical system in which the reflective surface 410a of the reflective spatial light modulator 410 and the entrance pupil plane 430a of the converging lens unit 430 are in the imaging relationship is not limited to the pair of lenses 422 and 423, and may be one including the first lens system (for example, a doublet, three or more lenses, or the like) on the reflective spatial light modulator 410 side, and the second lens system (for example, a doublet, three or more lenses, or the like) on the converging lens unit 430 side, or the like.

In the above-described embodiment, the profile acquisition camera 464 only needs to locate the imaging surface 464a thereof on a plane conjugate with the reflective surface of the liquid crystal layer 216 of the reflective spatial light modulator 410, and the profile acquisition camera 464 may be arranged at the position of the conjugate plane 491. In this case, the lens 463 is unnecessary in the laser processing device 200 (see FIG. 16). In the above-described embodiment, the relay magnification of the lens 422, lens 423, and lens 463 may be an arbitrary magnification. Although the reflective spatial light modulator 410 is included in the above-described embodiment, the spatial light modulator is not limited to the reflective type, and may be a spatial light modulator of a transmission type.

The converging lens unit 430 and the pair of distance measuring sensors 450 are attached to the end 401d of the housing 401 in the Y-axis direction; however, the converging lens unit 430 and the pair of distance measuring sensors 450 only need to be attached at a side closer to the end 401d from the center position of the housing 401 in the Y-axis direction. The reflective spatial light modulator 410 is attached to the end 401c of the housing 401 in the Y-axis direction; however, the reflective spatial light modulator 410 only needs to be attached at a side closer to the end 401c from the center position of the housing 401 in the Y-axis direction. In addition, the distance measuring sensors 450 may be arranged only on one side of the converging lens unit 430 in the X-axis direction.

The first pattern and the second pattern displayed on the reflective spatial light modulator 410 before and after the switching control performed by the spatial light modulator controller 502 are not limited to the combination described above. The phase pattern displayed on the reflective spatial light modulator 410 before and after the switching control may be an arbitrary phase pattern in which the intensity difference of the laser light can be generated when the operation of the reflective spatial light modulator 410 is normal. For example, the second pattern may not include the diffraction lattice pattern.

Note that the slit member may not be used even in a case where the second pattern includes the diffraction lattice pattern. This is because, for example, even if the slit member is not used, the diffracted light higher than a certain order can be blocked by an opening of another optical device. In addition, regardless of whether the diffracted light higher than the certain order is blocked, the intensity difference can be generated by comparing the intensity of the laser light L before the switching control with the intensity of a part of the diffracted light (for example, zero-order diffracted light) of the laser light L after the switching control.

Further, the laser processing devices 200, 200B, and 200C may have modes other than the processing mode and the measurement mode. Furthermore, the operation of the reflective spatial light modulator 410 can be checked when the other modes are being executed.

Figure 18:
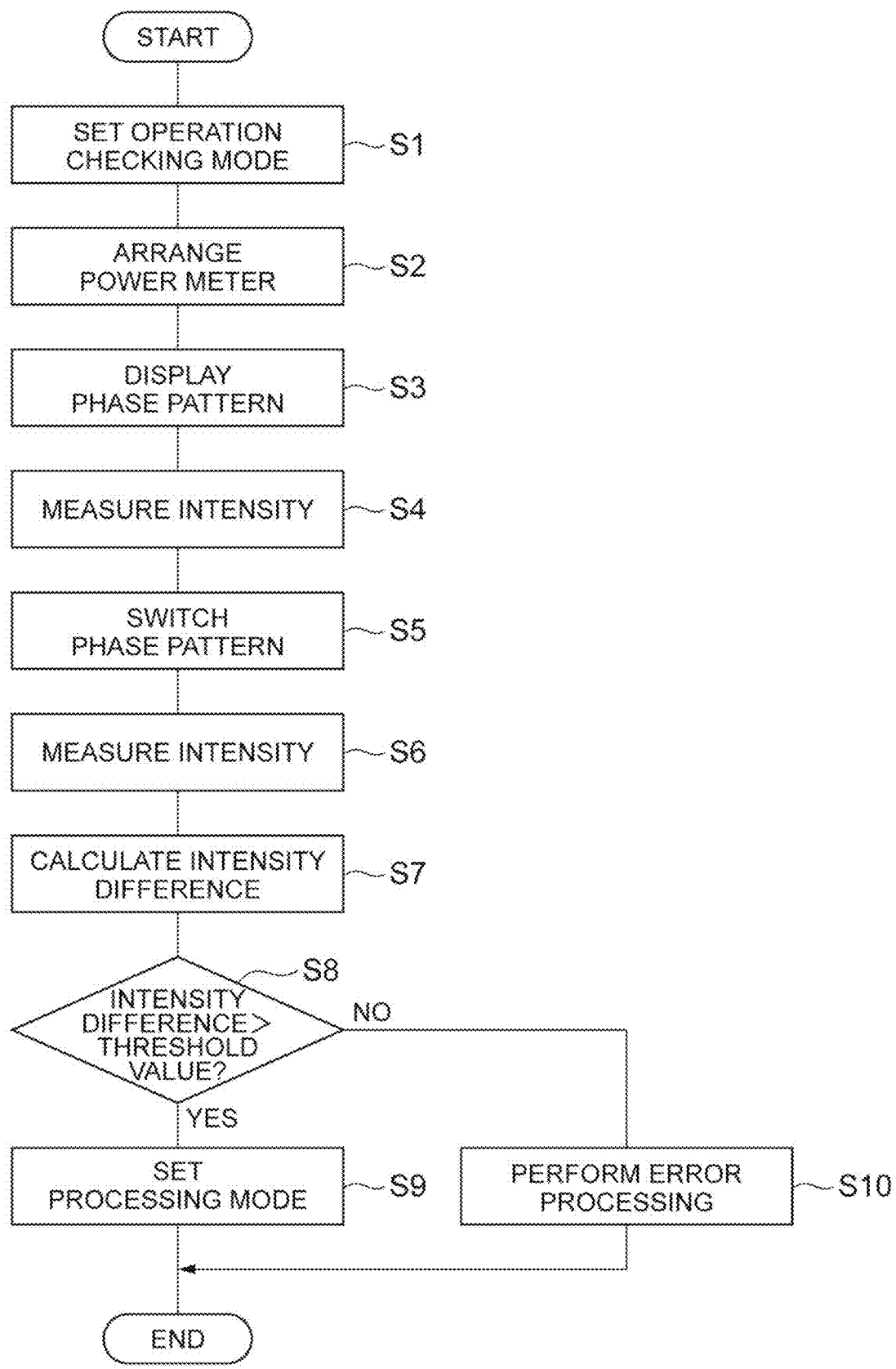
FIG. 18 is a flowchart illustrating an operation checking method of the laser processing device according to the first embodiment.
Figure 21:
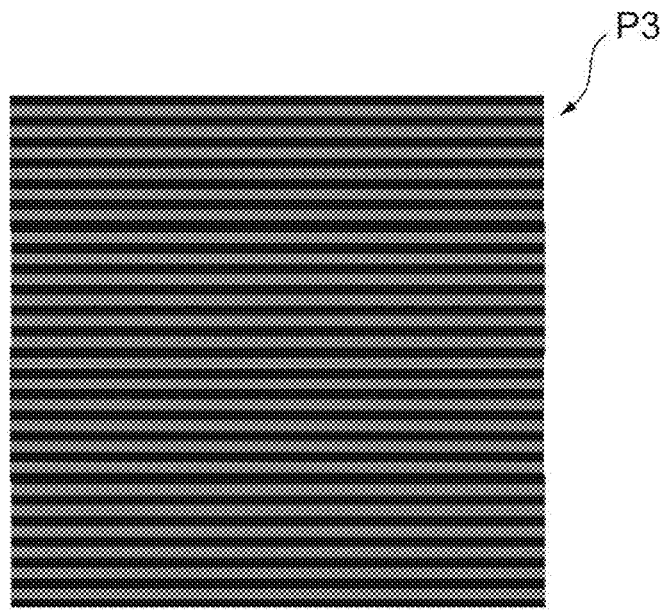
FIG. 21 is a view illustrating another exemplary diffraction lattice pattern and diffracted light.
Figure 21:
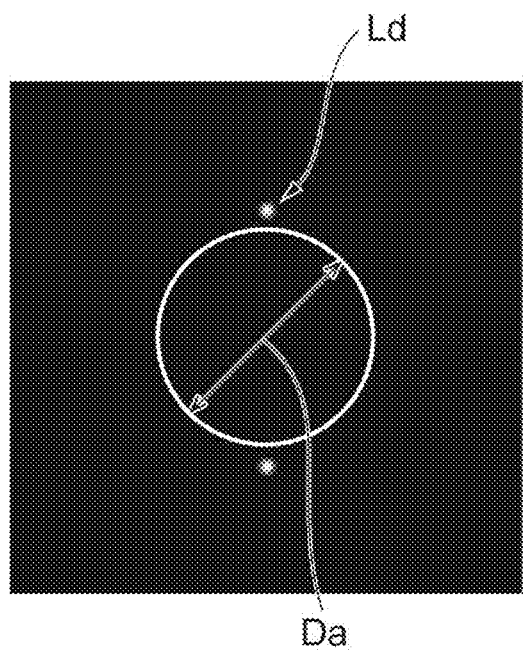

Here, the intensity measurement in step S4 and step S6 illustrated in FIG. 18 may be performed using a combination of the profile acquisition camera 464 or the camera 473 for monitoring an optical axis and an aperture. In a case where the profile acquisition camera 464 and the aperture are used, in step S5, the second pattern P3 illustrated in (a) of FIG. 21 is displayed on the reflective spatial light modulator 410. The second pattern P3 includes a diffraction lattice pattern having a relatively narrow groove pitch as compared with the diffraction lattice pattern included in the second pattern P2 (see (a) of FIG. 17) of the case where the power meter 520 and the slit member 424 are used. Therefore, as illustrated in (b) of FIG. 21, the position of the diffracted light Ld is located sufficiently away from the position of zero-order light. Therefore, the diffracted light Ld is cut by the aperture of the aperture diameter Da, whereby the intensity difference can be sufficiently generated between the intensity measured in step S4 and the intensity measured in step S6.

Figure 22:
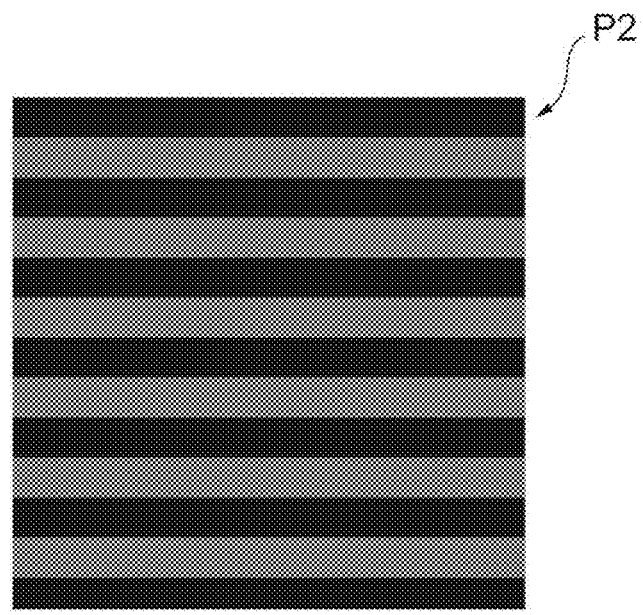
FIG. 22 is a view illustrating an exemplary diffraction lattice pattern and diffracted light.
Figure 22:
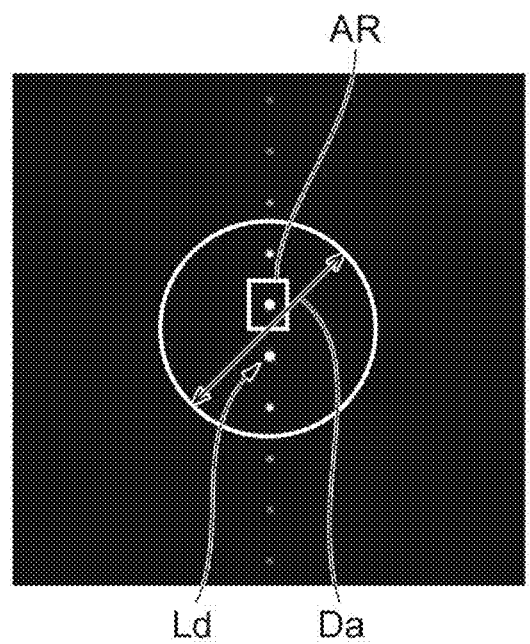

On the other hand, in a case where the camera 473 for monitoring an optical axis and the aperture are used, as illustrated in (a) of FIG. 22, the second pattern P2 is displayed on the reflective spatial light modulator 410. The groove pitch of the diffraction lattice pattern included in the second pattern P2 is wider than that in the case of the second pattern P3 described above. Therefore, as illustrated in (b) of FIG. 22, the position of the diffracted light Ld is relatively close to the position of zero-order light L0. Accordingly, at least a part of the diffracted light Ld passes through the aperture having the aperture diameter Da. In this case, it is therefore sufficient to obtain the intensity difference by paying attention to a certain area of the image of the camera 473. Specifically, paying attention to the area AR in (b) of FIG. 22, for example, when the second pattern P2 is displayed on the reflective spatial light modulator 410, the diffracted light Ld is imaged, whereby the intensity is relatively high. On the other hand, when the first pattern not including the diffraction lattice pattern is displayed on the reflective spatial light modulator 410, no light is imaged. Therefore, it is possible to obtain the sufficient intensity difference between the intensity measured in step S4 and the intensity measured in step S6.

Note that, in a case where the aperture is used, an aperture member may be separately introduced, or an opening of an optical member having been provided (such as a pupil opening of the 4f lens unit 420) may be used.

INDUSTRIAL APPLICABILITY

It is possible to provide a laser processing device and an operation checking method capable of checking operation of a spatial light modulator at timing other than the time of processing.

REFERENCE SIGNS LIST 1 object to be processed (object)
P2 phase pattern (second pattern)
100, 200, 200B, 200C laser processing device
310 laser oscillator (laser light source)
410 reflective spatial light modulator (spatial light modulator)
422 lens (focusing lens)
424, 424B slit member
430 converging lens unit (objective lens)
430a entrance pupil plane (pupil plane)
463 lens (focusing lens)
464 profile acquisition camera (camera)
464a imaging surface
502 spatial light modulator controller (controller)
506 determiner
L laser light.

The invention claimed is:
1. A laser processing device having at least a first mode in which an object is irradiated with laser light to perform laser processing and a second mode different from the first mode, the laser processing device comprising:
a laser light source configured to output the laser light;
a spatial light modulator configured to modulate the laser light output from the laser light source according to a phase pattern and emit the laser light;
an objective lens configured to converge the laser light emitted from the spatial light modulator onto the object;
a controller configured to control a phase pattern to be displayed on the spatial light modulator; and a determiner configured to determine whether operation of the spatial light modulator is normal when the second mode is being executed, wherein the controller performs switching control in which the phase pattern to be displayed on the spatial light modulator is switched when the second mode is being executed, and the determiner makes the determination on the basis of a change in intensity of the laser light emitted from the spatial light modulator between before the switching control and after the switching control.

2. The laser processing device according to claim 1, wherein the controller performs the switching control in which the phase pattern to be displayed on the spatial light modulator is switched from a first pattern to a second pattern including a diffraction lattice pattern when the second mode is being executed, and the determiner calculates an intensity difference by subtracting intensity of the laser light after the switching control from intensity of the laser light before the switching control, and makes the determination on the basis of determination on whether the intensity difference is larger than a threshold value.

3. The laser processing device according to claim 2, further comprising:

a focusing lens arranged between the spatial light modulator and the objective lens in an optical path of the laser light and configured to focus the laser light; and a slit member arranged at a focal position on a rear side of the focusing lens in the optical path of the laser light and configured to block diffracted light of the laser light higher than a certain order diffracted according to the diffraction lattice pattern.

4. The laser processing device according to claim 1, wherein the second mode is a measurement mode in which intensity of the laser light emitted from the objective lens is measured, and the determiner makes the determination on the basis of the intensity of the laser light obtained by a power meter arranged at a rear stage of the objective lens in an optical path of the laser light.

5. The laser processing device according to claim 1, further comprising:

a camera including an imaging surface conjugate with an entrance pupil plane of the objective lens and configured to obtain an image of the laser light, wherein the determiner makes the determination on the basis of the intensity of the laser light obtained on the basis of the image obtained by the camera.

6. An operation checking method of a spatial light modulator of a laser processing device including a laser light source configured to output laser light, the spatial light modulator configured to modulate the laser light emitted from the laser light source according to a phase pattern and emit the laser light, and a converging lens configured to converge the laser light emitted from the spatial light modulator onto an object, the method comprising:

a first step in which switching control for switching the phase pattern to be displayed on the spatial light modulator is performed when a second mode different from a first mode in which laser processing is performed by irradiating the object with the laser light is being executed in the laser processing device; and a second step in which determination on whether operation of the spatial light modulator is normal is made on the basis of a change in intensity of the laser light between before the switching control and after the switching control when the second mode is being executed.

* * * * *